US012651258B2

(12) United States Patent
Zarick et al.

(10) Patent No.: US 12,651,258 B2
(45) Date of Patent: Jun. 9, 2026

(54) USING SELF-REGULATING FUNCTIONS TO IMPLEMENT BLOCKCHAIN-BASED TOKEN ATTRIBUTION WITH REDUCED COMPUTATIONAL COMPLEXITY

(71) Applicant: LayerZero Labs Canada, Inc., Vancouver (CA)

(72) Inventors: Ryan Zarick, Vancouver (CA); Isaac Zhang, Tai Po (HK)

(73) Assignee: LayerZero Labs Canada, Inc., Vancouver (CA)

( * ) Notice: Subject to any disclaimer, the term of this patent is extended or adjusted under 35 U.S.C. 154(b) by 186 days.

(21) Appl. No.: 18/483,568

(22) Filed: Oct. 10, 2023

(65) Prior Publication Data

US 2025/0117789 A1 Apr. 10, 2025

(51) Int. Cl.
*G06Q 20/38* (2012.01)
*G06Q 20/36* (2012.01)

(52) U.S. Cl.
CPC ....... *G06Q 20/389* (2013.01); *G06Q 20/3676* (2013.01); *G06Q 20/3825* (2013.01)

(58) Field of Classification Search
CPC ............. G06Q 20/389; G06Q 20/3676; G06Q 20/3825; G06Q 20/3678; H04L 9/12; H04L 9/50
See application file for complete search history.

(56) References Cited

U.S. PATENT DOCUMENTS 10,102,265 B1 * 10/2018 Madisetti .............. G06Q 20/06

| | | | |
|---|---|---|---|
| 11,641,280 B1 | 5/2023 | Chapman | |
| 2017/0287068 A1 | 10/2017 | Nugent | |
| 2018/0082390 A1 | 3/2018 | Leidner | |
| 2019/0172026 A1 * | 6/2019 | Vessenes | G06Q 20/065 |
| 2019/0340267 A1 * | 11/2019 | Vo | G06F 16/2365 |
| 2019/0372772 A1 * | 12/2019 | Novotny | H04L 9/3239 |
| 2020/0193541 A1 * | 6/2020 | Barry | H04L 9/50 |

(Continued)

FOREIGN PATENT DOCUMENTS

| | | | | |
|---|---|---|---|---|
| SG | 10202004063 T * | 1/2021 | ............. | H04L 9/50 |
| WO | WO-2018213672 A1 * | 11/2018 | ......... | G06Q 20/3827 |

(Continued)

OTHER PUBLICATIONS

Zhu, Gengliang, Data Processing Method and Apparatus Based on Blockchain, and Deviceand Medium, Oct. 7, 2023, PE2E machine transalation of WO 2024244249 A1 (Year: 2025).*

(Continued)

*Primary Examiner* — Steven S Kim
*Assistant Examiner* — Janice Loza
(74) *Attorney, Agent, or Firm* — Lowenstein Sandler LLP

(57) ABSTRACT

A method includes receiving, from a source user account associated with a source digital wallet of a source blockchain, a request to perform a cross-chain operation from the source blockchain to a destination blockchain. The source blockchain is associated with a source token contract that stores a delta value indicative of a difference between a total number of tokens having an attribution property in circulation of the source blockchain and a number of tokens having the attribution property in circulation of the source blockchain that are accounted for by a vault of a primary blockchain. The attribution property identifies a token issuer. The method further includes causing a cross-chain message including a transaction payload to be generated based at least in part on the delta value, and causing the transaction payload to be applied to the destination blockchain.

18 Claims, 15 Drawing Sheets

(56)  References Cited

U.S. PATENT DOCUMENTS

| | | | |
|---|---|---|---|
| 2021/0019737 A1 | 1/2021 | Vladi | |
| 2021/0036855 A1* | 2/2021 | Kleniewski | H04L 9/3213 |
| 2021/0065070 A1 | 3/2021 | Augustine | |
| 2021/0133700 A1 | 5/2021 | Williams | |
| 2023/0073883 A1* | 3/2023 | Tierney | G06Q 20/3827 |
| 2023/0108610 A1* | 4/2023 | Tang | G06Q 20/3672 |
| | | | 705/66 |
| 2023/0169413 A1* | 6/2023 | Augustine | H04L 9/3213 |
| | | | 705/5 |
| 2023/0206228 A1* | 6/2023 | Seibel | G06Q 20/389 |
| | | | 705/41 |
| 2023/0289337 A1 | 9/2023 | Zarick | |
| 2023/0289791 A1 | 9/2023 | Zarick | |
| 2023/0360007 A1 | 11/2023 | Krishnaswamy | |
| 2024/0005409 A1* | 1/2024 | Doney | G06Q 20/3678 |
| 2024/0202679 A1* | 6/2024 | Mayerchak | H04L 9/50 |

FOREIGN PATENT DOCUMENTS

| | | | | |
|---|---|---|---|---|
| WO | 2020223272 A1 | 11/2020 | | |
| WO | WO-2024244249 A1 * | 12/2024 | | G06F 21/64 |

OTHER PUBLICATIONS

Data Processing Method and Apparatus Based on Blockchain, and Device and Medium; Zhu, Gengliang; PE2E translation of foreign patent WO-2024244249-A1 (Year: 2025).*

Proofs of Proof-of-Stake with Sublinear Complexity; Agrawal, Sheresth; Neu, Joachim; Tas, Ertem Nusret; Zindros, Dionysis; Oct. 24, 2023; <https://arxiv.org/pdf/2209.08673> (Year: 2023).*

Atomic Cross-Chain Swaps with Improved Space and Local Time Complexity; Imoto, Soichiro; Sudo, Yuichi; Kakugawa, Hirotsugu; Masuzawa, Toshimitsu; <https://arxiv.org/pdf/1905.09985> (Year: 2019).*

PCT Notification of Transmittal of the International Search Report and the Written Opinion of the International Searching Authority for PCT Application No. PCT/CA2023/051659, mailed on Jun. 19, 2024, 8 pages.

PCT Notification of Transmittal of the International Search Report and The Written Opinion of the International Searching Authority for PCT Application No. PCT/CA2023/051657, mailed Apr. 12, 2024, 9 pages.

* cited by examiner

Token contract
109

Vault
101

104-2

104-1

103

Token issuer
102

107

User account
105-1

User account
105-2

Circulation space
108

106-1

106-2

200

400

500A

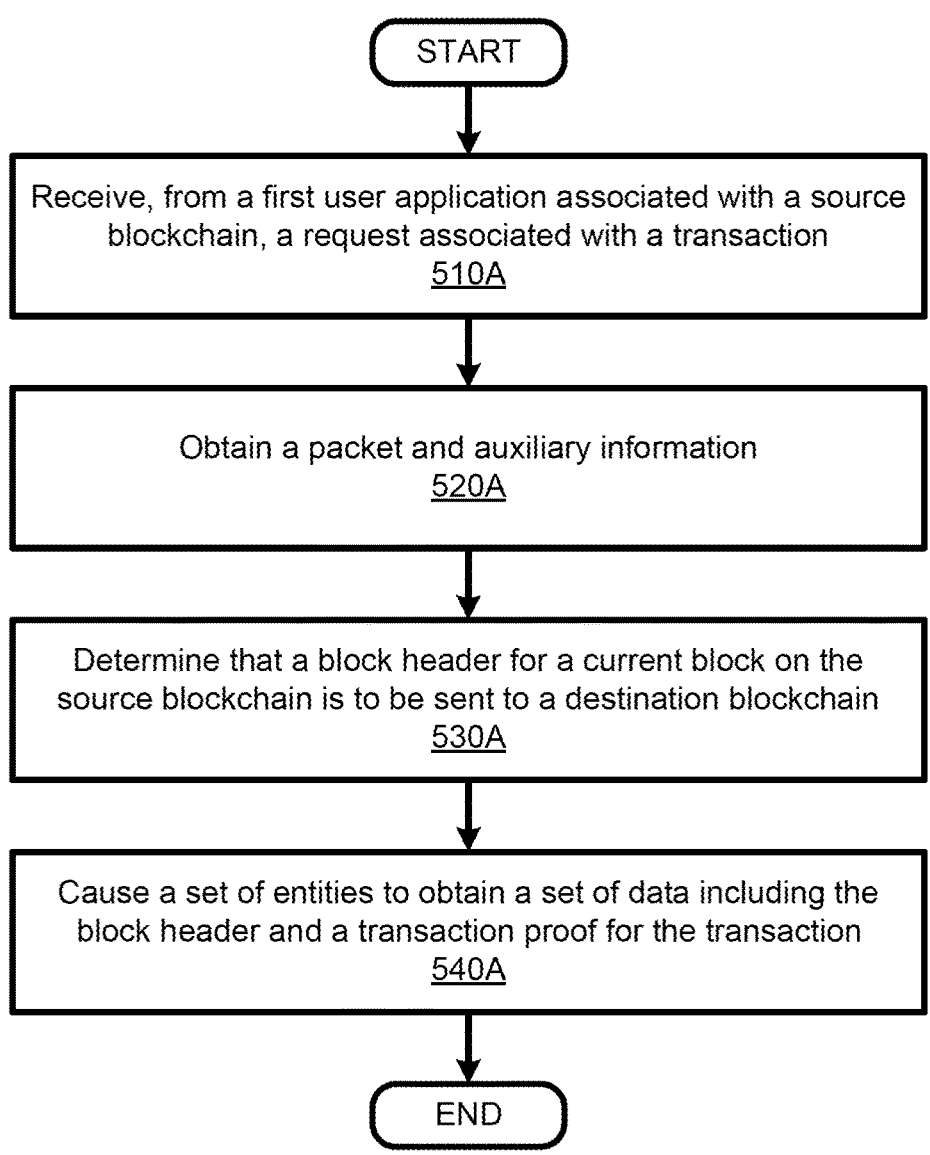

START

Receive, from a first user application associated with a source blockchain, a request associated with a transaction
510A Obtain a packet and auxiliary information
520A Determine that a block header for a current block on the source blockchain is to be sent to a destination blockchain
530A Cause a set of entities to obtain a set of data including the block header and a transaction proof for the transaction
540A

END

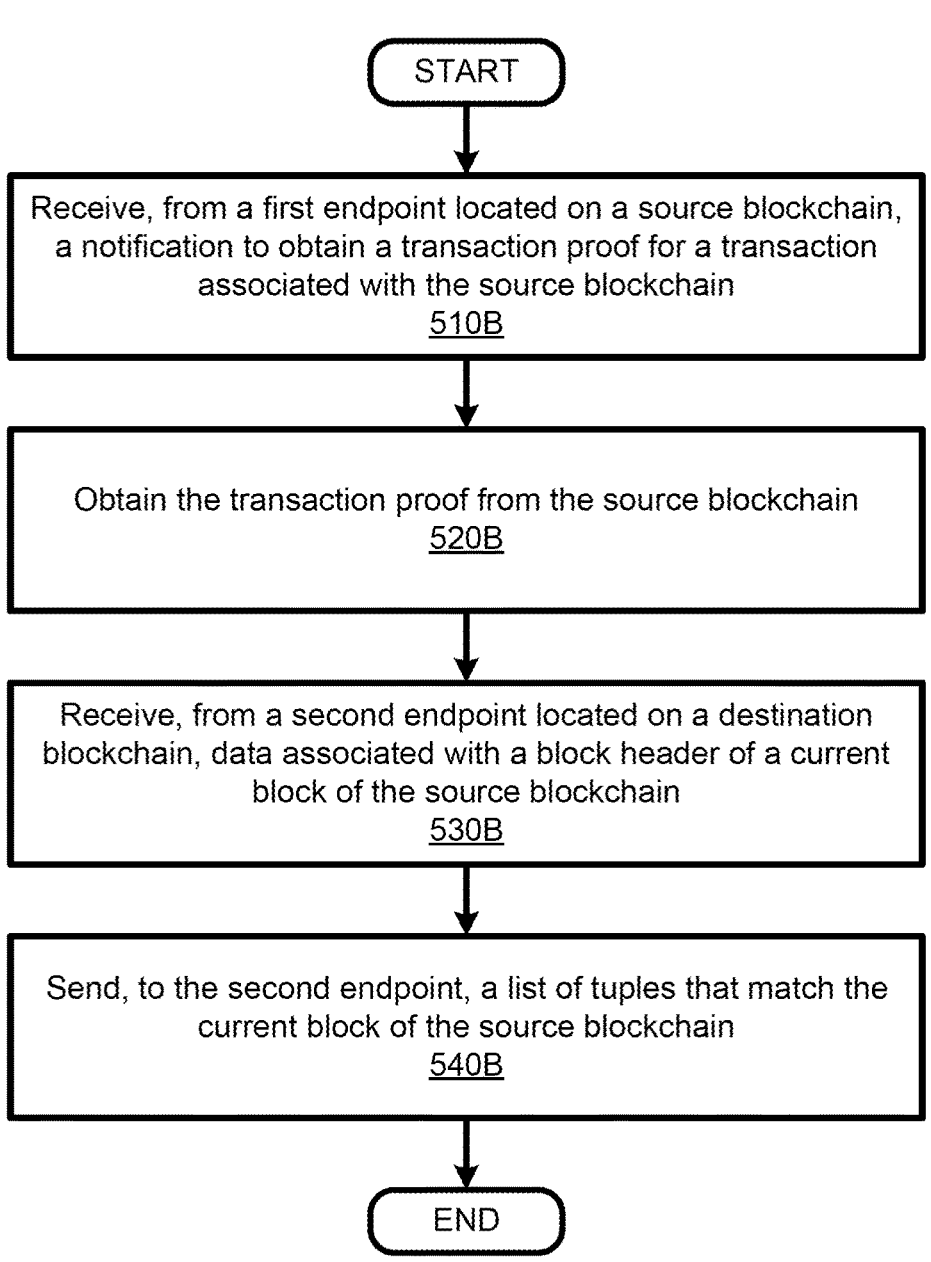

START

Receive, from a first endpoint located on a source blockchain, a notification to obtain a transaction proof for a transaction associated with the source blockchain
510B Obtain the transaction proof from the source blockchain
520B Receive, from a second endpoint located on a destination blockchain, data associated with a block header of a current block of the source blockchain
530B Send, to the second endpoint, a list of tuples that match the current block of the source blockchain
540B

END

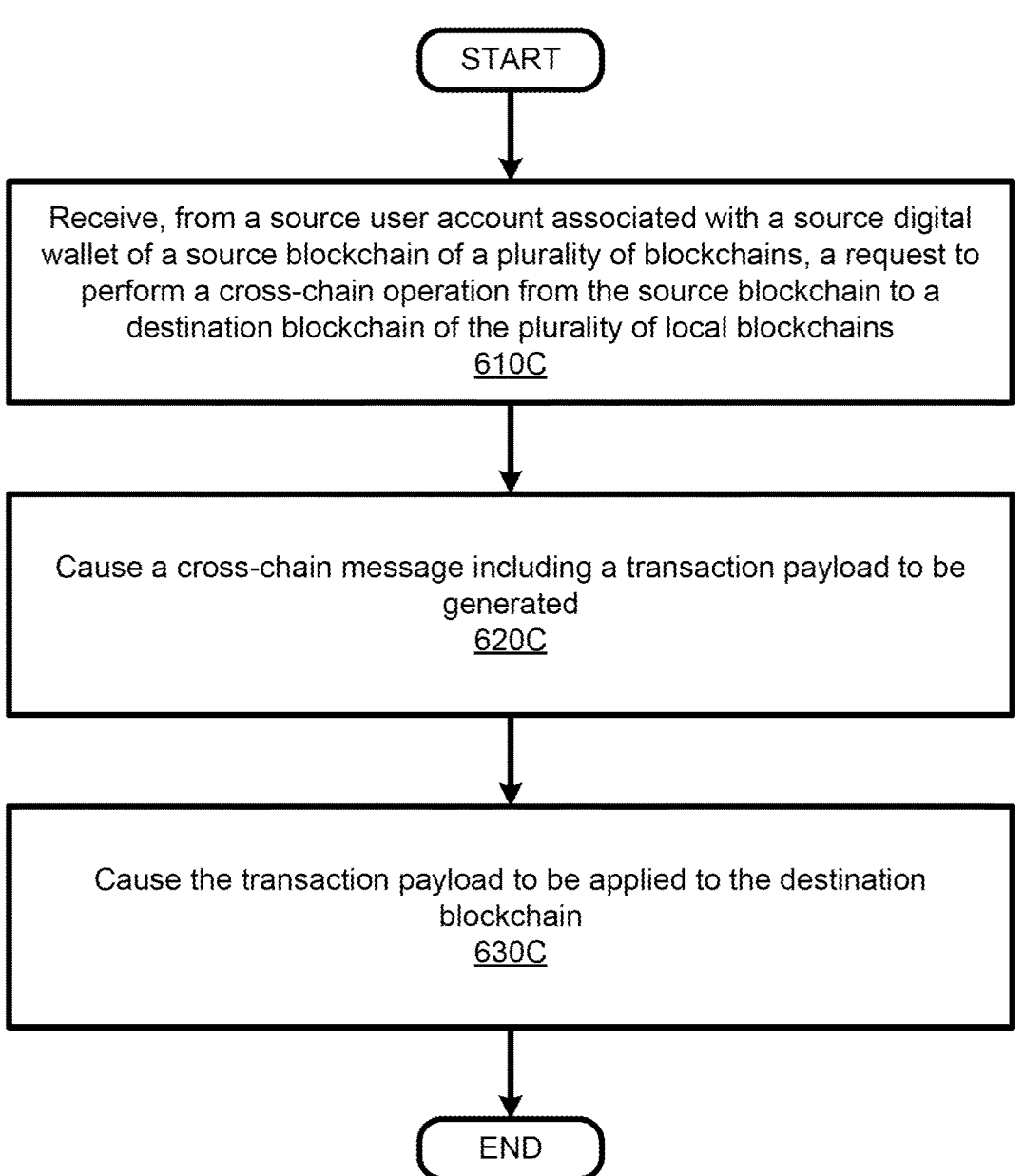

START

Receive, from a source user account associated with a source digital wallet of a source blockchain of a plurality of blockchains, a request to perform a cross-chain operation from the source blockchain to a destination blockchain of the plurality of local blockchains
610C Cause a cross-chain message including a transaction payload to be generated
620C Cause the transaction payload to be applied to the destination blockchain
630C

END

FIG. 6C

USING SELF-REGULATING FUNCTIONS TO IMPLEMENT BLOCKCHAIN-BASED TOKEN ATTRIBUTION WITH REDUCED COMPUTATIONAL COMPLEXITY

TECHNICAL FIELD

The disclosure is generally related to blockchains and other distributed ledgers, and more particularly, to using self-regulating functions to implement blockchain-based token attribution with reduced computational complexity.

BACKGROUND

A network can include a decentralized network of nodes (i.e., computing devices), each of which maintains a copy of a distributed ledger, or blockchain, for tracking and managing transactions occurring within the network. More particularly, a blockchain can be a chain of cryptographically linked blocks of data ("blocks"), where each block of the blockchain maintains a record of one or more completed transactions. A transaction can reflect an update to data maintained by one or more accounts of the network. One example of a transaction is a transfer of a digital asset from one entity to another entity. Another example of a transaction is an exchange of digital assets. An exchange can involve the transfer of a digital asset from a source network having a source blockchain to a destination network having a destination blockchain. The nodes are responsible for managing (e.g., verifying) the transactions before appending them to the blockchain. At the core of the blockchain concept are the three pillars of decentralization, transparency, and immutability. No single node within a network can control a blockchain, and actions on the blockchain are verifiable and irreversible. These three pillars create a foundation upon which an entity can act without trusting another entity.

A block can include one or more transaction records and a cryptographic digest ("digest") of the previous block representing the previous batch of transactions. A digest can be generated by a one-way function that produces the same output data for a given input. A one-way function is a function that, from a computational complexity perspective, is "easy" to obtain an output for a given input, but "hard" to invert the output to identify the given input. For example, the digest can be a hash value, which is an output string of data generated by employing a hashing method to an input string of data. Although the input string can be arbitrarily large, the output hash value can be set to a fixed size in accordance with the hashing method used. Digests provide a secure way to maintain integrity of the blockchain. For example, any attempted change of an earlier block will result in the modified digest of the block, which would require modifications to all subsequent blocks in the blockchain (i.e., tamper-proofing).

An asset generally refers to an object or property that is owned or controlled by an entity (e.g., an individual or a group of individuals), and can have a distinct usage right. For example, a physical asset refers to a tangible asset. As another example, a digital asset refers to an electronic asset (e.g., intangible asset). A digital asset can be represented by a cryptographic token ("token"). One example of a token is a fungible token, in which the token is replaceable with other tokens of the same type and/or value. For example, a fungible token can represent a unit of value of a cryptocurrency (e.g., digital coin). Fungibility means that each unit of an asset, such as a token, is essentially identical and can be exchanged on a one-to-one basis with any other unit of the asset. Their fungible nature enables fungible tokens to be easily exchanged, traded and/or used within blockchain systems. Another example of a token is a non-fungible token (NFT). In contrast to fungible tokens, an NFT represents a unique asset that is not interchangeable with another asset. An NFT can have distinct characteristics or properties that differ from other NFTs that define the uniqueness. For example, NFTs can represent things like digital art, digital collectibles, etc. Yet another example of a token is a semi-fungible token (SFT), which is a token that combines properties of both a fungible token and a non-fungible token. Each token within a set of SFTs can have unique properties or attributes, distinguishing it from other tokens in the set of SFTs. However, tokens within the same set of SFTs are still considered interchangeable and can be exchanged on a one-to-one basis. Accordingly, SFTs introduce a level of variability among tokens that are otherwise fungible in nature.

BRIEF DESCRIPTION OF THE DRAWINGS

The disclosure is illustrated by way of examples, and not by way of limitation, and may be more fully understood with references to the following detailed description when considered in connection with the figures, in which:

FIGS. 6A-6C are flow diagrams of example methods for using self-regulating functions to implement blockchain-based token attribution with reduced computational complexity, in accordance with some implementations.

DETAILED DESCRIPTION

Figure 1A:
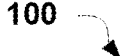
FIGS. 1A-1D are diagrams of example computer systems for using self-regulating functions to implement blockchain-based token attribution with reduced computational complexity, in accordance with some implementations.

Described herein are systems and methods for using self-regulating functions to implement blockchain-based token attribution with reduced computational complexity. FIG. 1A shows a system 100 corresponding to a blockchain network, in accordance with some implementations. System 100 includes a token transaction management system to manage token transactions that occur within system 100. As will be described in further detail, examples of token transactions that can occur within system 100 include minting, redemption and token transfers.

For example, the token transaction management system can include vault 101. Vault 101 is a service (e.g., hardware and/or software component) that can support a set of functions that enables user accounts to mint and/or redeem tokens within the blockchain network, as will be described in further detail below. Vault 101 can implement a user interface that can receive inputs from a user account for executing one or more functions of the set of functions. Thus, the user interface can make token creation and/or management more accessible by reducing the amount of technical knowledge and/or programming skills needed to create and/or manage tokens. Vault 101 can be created by administrator. In some implementations, vault 101 uses at least one smart contract to implement the set of functions. In some implementations, vault 101 is a smart contract of system 100. Generally, a smart contract is a sequence of executable instructions stored on a blockchain network that enables at least one function. The sequence of executable instructions can specify one or more conditions to be verified and one or more actions to be performed should the conditions be successfully validated. A smart contract can be stored on a blockchain network. When a smart contract is deployed, it becomes part of the blockchain and is replicated and stored on all participating nodes within the blockchain network.

System 100 can include a set of user accounts. For example, each user account of the set of user accounts can have an associated digital wallet linked to system 100. For example, as shown, the set of user accounts can include at least one token issuer 102. Token issuer 102 is the user account of an entity that has minted at least one token 103 within the blockchain network. Generally, minting refers to the process of creating a token (e.g., token 103) within system 100, which brings the token into circulation within circulation space 108.

In some implementations, token 103 is a fungible token. Fungible tokens can be used to enable a variety of utility functions within a system, such as electronic transactions, electronic payments, electronic voting, etc. For example, some decentralized applications (DApps) (e.g., decentralized finance (DeFi) applications) can use fungible tokens to provide an easy-to-use, reliable and trustworthy electronic payment mechanism. In some implementations, token 103 is a stablecoin. A stablecoin refers to a token (e.g., fungible token) that is designed to maintain an approximately stable value to minimize price fluctuations and to provide a more reliable store of value and medium of exchange within a network. For example, a stablecoin can be a fiat-backed stablecoin backed by fiat currency and pegged to the value of the underlying fiat currency. As another example, a stablecoin can be a commodity-backed stablecoin backed by a commodity and pegged to the value of the underlying commodity. As yet another example, a stablecoin can be a crypto-backed stablecoin backed by another digital asset, such as another fungible token. To do so, a user can deposit an amount of the other digital asset as collateral and stablecoins can be issued against this collateral. As yet another example, a stablecoin can be an algorithmic stablecoin that uses a stablecoin supply control mechanism that modifies stablecoin supply in response to market conditions to maintain price stability. The stablecoin supply control mechanism can use a smart contract to automatically modify stablecoin supply.

As shown in FIG. 1A, in response to vault 101 receiving mint request 104-1 from token issuer 102 to mint at least one token 103, vault 101 can create and deliver at least one token 103 to token issuer 102, as indicated by arrow 150-2. For example, mint request 104-1 can trigger (e.g., call) a mint function of the set of functions of vault 101, and vault 101 can execute the mint function to satisfy mint request 104-1. A mint function can be defined by a token standard supported by the blockchain network. For example, a set of arguments of a mint function (e.g., received as part of mint request 104-1) can include an address of the token issuer who has triggered the mint function, and a number of tokens to be minted. Like any other blockchain-based transaction, a consensus protocol can be used by the nodes of the blockchain network to verify a mint transaction before the corresponding transaction record can be added to the blockchain. In some implementations, token issuer 102 is a stablecoin issuer and token 103 is a stablecoin. As a stablecoin issuer, token issuer 102 can mint token 103 in exchange for some amount of external assets received from an external user account owned by token issuer 102 (e.g., fiat-backed stablecoins, commodity-backed stablecoins or crypto-backed stablecoins).

The set of user accounts can include one or more additional user accounts that are not token issuers. For example, as shown, system 100 can include user accounts 105-1 and 105-2. Token issuer 1022 can transfer tokens to one or more additional user accounts (e.g., to one or more digital wallet addresses of the one or more additional user accounts). For example, as shown, at least one token 106-1 has been transferred from token issuer 102 to user account 105-1, and at least one attributed token 106-2 has been transferred from token issuer 102 to user account 105-2. Additionally, tokens can be transferred between user accounts 105-1 and 105-2. Further details regarding token transfers will be described herein below with reference to FIG. 1B.

To maintain value stability, system 100 can offer a promise or expectation that a token (e.g., stablecoin) owned by a user via a user account (e.g., user account 105-1 or user account 105-2) can be redeemed by the user at par value upon request. Generally, redemption refers to the process of exchanging a token within system 100 (e.g., within circulation space 108) for the underlying external asset equal to the par value. The underlying external asset can be electronically transferred to an external account owned by the user (e.g., an external bank account). As shown in FIG. 1A, in response to vault 101 receiving redemption request 107 from user account 105-1 to redeem at least one token 106-1, vault 101 can redeem at least one token 106-1. For example, redemption request 107 can trigger (e.g., call) a redemption function of the set of functions of vault 101, and vault 101 can execute the redemption function to satisfy redemption request 107. Generally, a redemption function can be defined by a token standard supported by the blockchain network. For example, a set of arguments of a redemption function can include an address of the token redeemer who has triggered the redemption function (e.g., an address of user account 105-1), and a number of tokens to be redeemed. Like any other blockchain-based transaction, a consensus protocol can be used by the nodes of a blockchain network to verify a redemption transaction before the corresponding transaction record can be added to the blockchain.

Since a blockchain of a blockchain network is an immutable digital ledger, a token cannot be deleted from existence from the blockchain network as part of the redemption process. Instead, redeeming a token can include burning a token to remove the token from circulation within the blockchain network (e.g., removed from circulation space 108). Burning a token can include transferring the token from the user account of the token redeemer (e.g., user account 105-1) to a special purpose account (e.g., digital wallet) having a special purpose address, from which the digital asset cannot be transferred by future transactions. For example, the special purpose address can be the null address for the blockchain network. Thus, although a burned token (e.g., token transferred to the special purpose address) still exists within the blockchain network, the burned token is made inaccessible to other user accounts within the blockchain network. Burning a digital asset can involve payment of transaction fees. For example, a token can be burned by executing a set of executable instructions (e.g., a set of executable instructions of a smart contract). The set of executable instructions can include an instruction that, when executed, can determine whether there are sufficient funds in the digital wallet connected to the digital asset issuer. The set of executable instructions can further include an instruction that, when executed after determining that there are sufficient funds in the user account of the token redeemer, can transfer the at least one token to be burned to the special purpose account.

The token transaction management system can further include token contract 109. In this example, token contract 109 is separate from vault 101 (e.g., vault 101 implements a different smart contract than token contract 109). In some implementations, token contract 109 is included in vault 101, or vice versa (e.g., vault 101 and token contract 109 implement the same smart contract). Token contract 109 can be created by an administrator of system 100. In some implementations, token contract 109 includes a transfer function to enable transfer of tokens between user accounts (e.g., between digital wallet addresses). An example of token contract enabling transfer of tokens between user accounts will be described in further detail below with reference to FIG. 1B.

In some implementations, token contract 109 stores token balances for each user account (e.g., digital wallet) of the set of user accounts of system 100. For example, token contract 109 can maintain mappings of user account addresses (e.g., digital wallet addresses) to respective token balances within the blockchain network. Possession of tokens by user accounts (e.g., associated with digital wallets) may be tracked and/or modified by token contract 109. In some implementations, minting at least one token 103 can include token contract 109 updating the token balance of token issuer 102 by incrementing the token balance of token issuer 102 by at least one token. In some implementations, redeeming at least one token 106-1 can include token contract 109 updating the token balance of user account 105-1 by decrementing the token balance of user account 105-1 by at least one token. In some implementations, transferring at least one token from a sender to a receiver includes updating the token balances of the sender and the receiver by decrementing the token balance of the sender by at least one token and incrementing the token balance of the receiver by at least one token. Accordingly, instead of having the tokens being held in the user accounts (e.g., digital wallets) directly, the tokens of all user accounts can be held within token contract 109, where the token balances are mapped to respective user accounts via respective user account addresses (e.g., digital wallet addresses). Further details regarding the token transaction management system, including vault 101 and token contract 109, will be described herein below.

In some implementations, the token transaction management system implements a token attribution method to keep track of the total number of tokens (e.g., stablecoins) that have been minted by at least one token issuer 102. For example, vault 101 can assign token issuer 102 with an attribution property as an identifier (ID) that uniquely reflects token issuer 102. For example, the attribution property can be defined as token metadata (e.g., a metadata tag). In some implementations, an attribution property is referred to as a token color ("color"). As part of the minting process, the mint function can include a token assignment function that assigns (e.g., links), to each token that is minted by token issuer 102, the attribution property identifying token issuer 102 (e.g., one-to-one mapping function). One example of a token assignment function is an incremental identifier mapping function, in which tokens minted by a first token issuer are assigned a first attribution property, tokens minted by a second token issuer are assigned a second attribution property, etc. However, any suitable token assignment function can be used in accordance with implementations described herein. Accordingly, each token minted within system 100 will have an assigned attribution property. Token balances of user accounts (e.g., digital wallets), which can be tracked by token contract 109, can be represented as a tuple of token attribution and quantity. For example, if a user account holds Ntokens having attribution property A, then the token balance can be represented by the tuple $A|N$.

One type of token attribution method that can be implemented by the token transaction management system is a lossless token attribution method. The lossless token attribution method can be implemented by the token transaction management system (e.g., token contract 109) maintaining a per-mint token attribution with respect to tokens owned across all user accounts.

However, various practical constraints exist that can prevent the token transaction management system from using a lossless token attribution method to track token attribution. One example of a constraint is computational resource cost. For example, a lossless token attribution method can be computationally expensive to implement as the number of different token issuers increases within system 100, due at least in part to the space complexity required for the token transaction management system to maintain a per-minter token attribution for every user account (e.g., digital wallet). Space complexity refers to the amount of memory or storage space needed to solve a computational problem. For example, in a lossless token attribution method, the token transaction management system can store, for each user account (e.g., digital wallet), a token balance that reflects a token attribution for each token issuer. The space complexity needed to track token attribution using a lossless token attribution method can be approximately linear with respect to the number of token issuers. To illustrate, assume that a digital wallet has a single designated attribution property and has a total balance of 1,000 tokens. Further assume each of the 1,000 tokens can be minted by a different token issuer, such that only 1 token of the 1,000 tokens has the single designated attribution property. To keep track of token attribution using a lossless token attribution method in this illustrative example, the token transaction management system would need to store, for each of the 1,000 different attribution properties, a token balance of 1 token (e.g., linear space complexity). As another example, it is possible for a user account (e.g., digital wallet) with tokens from too many token issuers to be unable to transact due to running into a maximum gas limit (e.g., maximum cost per unit of computation that a user account can spend. To illustrate, if a user account needs to send 100,000 tokens each having a different token attribution from one user account to another user account, it may be impossible to do in one transaction. Accordingly, a lossless token attribution method may not be a computationally tractable token attribution solution as the number of different token issuers increases within system 100.

Aspects and implementations of the disclosure address the above and other deficiencies by providing technology that uses self-regulating functions to implement blockchain-based token attribution with reduced computational complexity. More specifically, the token transaction management system can use a lossy token attribution method that can achieve sub-linear computational complexity.

To implement the lossy token attribution method, at least one designated attribution property can be assigned to each user account (e.g., digital wallet address). A designated attribution property indicates the attribution property that each token maintained by the user account must have. A designated attribution property can be assigned to a user account using any suitable method. In some implementations, a designated attribution property assigned to a user account is selected by the user of the user account. In some implementations, the token transaction management system assigns a designated attribution property to a user account. For example, the token transaction management system can randomly assign a designated attribution property to a user account. The token transaction management system can maintain a record of designated attribution properties across user accounts.

If receiver receives, from a sender, a token having an attribution property that is the same as the designated attribution property assigned to the receiver, then the token is a conforming token that can simply be transferred to the receiver and the corresponding token balances can be updated by the token transaction management system. However, it may be the case that at least one token being transferred from a sender to a receiver is a non-conforming token having an attribution property different than the designated attribution property assigned to the receiver.

To address this, the transfer function can cause token reattribution. Generally, reattributing a token from a first attribution property to a second attribution property can include causing a token having the first attribution property to be burned, and causing a token having the second attribution property to be minted. Token reattribution can occur either by reattributing the at least one token sent by the sender to the designated attribution property of the receiver, or by reattributing the token balance of the receiver to the attribution property of the at least one token sent by the sender.

A lossy token attribution method described can reduce the computational complexity and/or space complexity to track token attribution within the system, as compared to a lossless token attribution method. For example, the space complexity to track token attribution using the lossy token attribution method can be sublinear with respect to the number of token issuers. In some implementations, the space complexity is constant. A constant space complexity means that the amount of computing resources (e.g., memory) used to store the token balance for a user account is the same regardless of the number of token issuers that have minted tokens within the system (i.e., the number of different token attributions). This is because only a single token balance of attributed tokens having the designated attribution property needs to be tracked for each user account. Accordingly, implementing a process of reattributing non-conforming tokens into conforming tokens during token transfers between senders and receivers can make tracking token attribution computationally feasible. An example of this process will be described below with reference to FIG. 1B.

In some implementations, token attribution is used to determine an amount of yield to provide to token issuer 102. "Yield" refers to a reward (e.g., additional tokens, interest or fees) earned by token issuer 102 based on the number of tokens minted by token issuer 102 that are in circulation within system 100 (e.g., within circulation space 108). For example, yield can be distributed at a fixed interval (e.g., daily at a particular time) based on the number of tokens minted by token issuer that are in circulation within system 100. More specifically, token issuer 102 can be eligible to receive a proportionate amount of a total yield, where the proportionate amount of the total yield corresponds to the proportion of tokens minted by token issuer 102 to the total number of tokens that are in circulation within system 100. Illustratively, if it is determined that token issuer 102 has minted 100 tokens of 1,000 tokens that are in circulation within system 100 at the time of yield distribution, then system 100 can distribute 10% of the total yield to token issuer 102. Yield for a token may no longer be provided to token issuer 102 after the token is redeemed and removed from circulation within system 100. Accordingly, yield can function as an incentive to token issuer 102 to maximize token minting and circulation time within system 100.

Figure 1B:
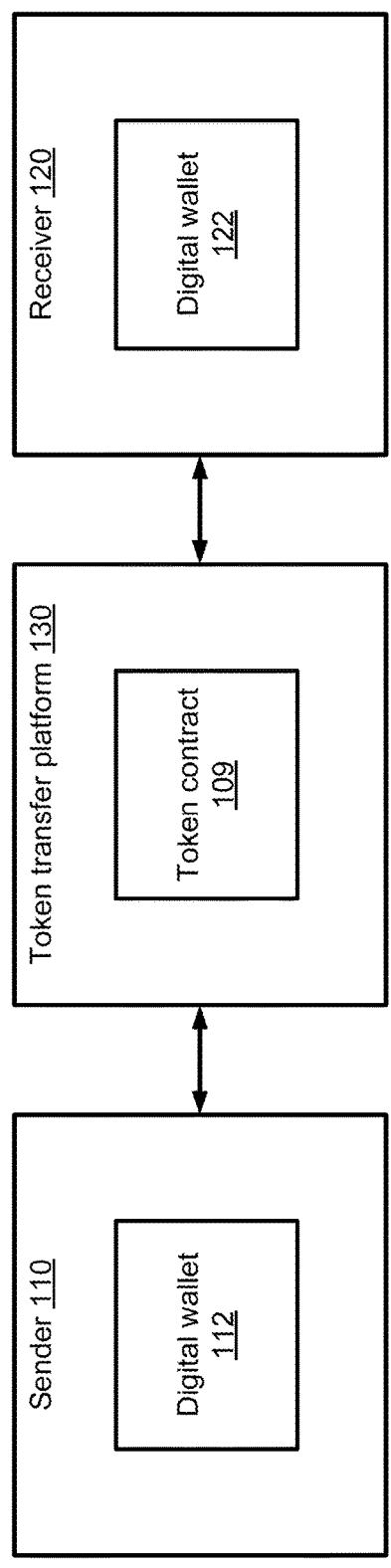

FIG. 1B is a diagram illustrating a single-chain token transfer within system 100, in accordance with some implementations. As shown, system 100 can include sender user account ("sender") 110 that owns digital wallet 112 and receiver user account ("receiver") 120 that owns digital wallet 122. Digital wallet 112 and digital wallet 122 can each be linked to the same local token contract 109 of a local blockchain. In some implementations, the source blockchain and the destination blockchain are the same. System 100 can further include token transfer platform 130. Token transaction platform 130 can be any node (e.g., server) of the system connected to the peer-to-peer (P2P) network of the underlying blockchain network to publish transactions. Token transaction platform 130 can implement a transfer function of token contract 109 to enable sender 110 to transfer tokens to receiver 120.

To initiate the transfer of tokens to receiver 120, sender 110 can send a transfer request to token transaction platform 130. The transfer request can designate a number of tokens to be sent from sender 110 to receiver 120 (i.e., a transfer amount) and an address of receiver 120 (e.g., the address of digital wallet 122). Each token sent from sender 110 is assumed to have a designated attribution property assigned to digital wallet 112, and at least one designated attribution property is assigned to receiver 120 (e.g., digital wallet 122).

Upon receiving the transfer request from sender 110, token transaction platform 130 can trigger (e.g., call) a transfer function of a token contract to cause a transaction payload equal to the number of tokens to be sent from digital wallet 112 to digital wallet 122 (e.g., debit digital wallet 112) and cause the transaction payload to be received by digital wallet 112 (e.g., credit digital wallet 122). In a single chain transfer, the operations of the transfer function can be combined in a single local transaction (e.g., atomic transaction).

The operation of the token transfer can change based on whether any non-conforming tokens are included in the transaction payload. If the transaction payload only includes conforming tokens, then the transfer function can simply send the transaction payload to digital wallet 122. However, if the transaction payload includes at least one non-conforming token, then the transfer function can cause reattribution of each non-conforming token into a conforming token (e.g., by burning the non-conforming token and minting the conforming token). In some implementations, the transfer function causes reattribution of at least one non-conforming token sent by sender 110 to the designated attribution property of receiver 120. In alternative implementations, the transfer function causes reattribution of the token balance of receiver 120 to the attribution property of the at least one non-conforming token sent by sender 110.

In some implementations, system 100 includes multiple blockchains ("multi-chain system") forming a global blockchain network, and the token transfer is a cross-chain transfer from sender linked to a source blockchain and a receiver linked to a destination blockchain different from the source blockchain. An example of a multi-chain system will be described in further detail below with reference to FIG. 1C.

A multi-chain system can support single-chain (e.g., intrachain) transfers, such as that shown in FIG. 1B. Additionally, a multi-chain system can support cross-chain (e.g., interchain) transfers. To perform a cross-chain transfer, the transfer function can implement a send transaction and a receive transaction. Generally, during the send transaction, the transfer function can cause a cross-chain message to be generated and sent to receiver 120. In some implementations, the cross-chain message includes a data packet ("packet"). Generating the cross-chain message can include moving the transfer amount of tokens from digital wallet 112 into the cross-chain message. That is, the cross-chain message includes a transaction payload that includes the transfer amount of tokens. Examples of generating and sending cross-chain messages will be described herein below with reference to FIGS. 2A-5B. Generally, during the receive transaction, the transfer function can cause the transaction payload to be moved from the cross-chain message to digital wallet 122. Additionally, any non-conforming tokens can be reattributed to respective conforming tokens.

However, cross-chain transfers can introduce messaging asynchrony between the debit of the transaction payload from the token balance of sender 110 and the credit of the transaction payload to the token balance of receiver 120. As will be described in further detail below with reference to FIGS. 1C-1D, implementations described herein can be used to reduce asynchrony in a computationally feasible way.

Figure 1C:
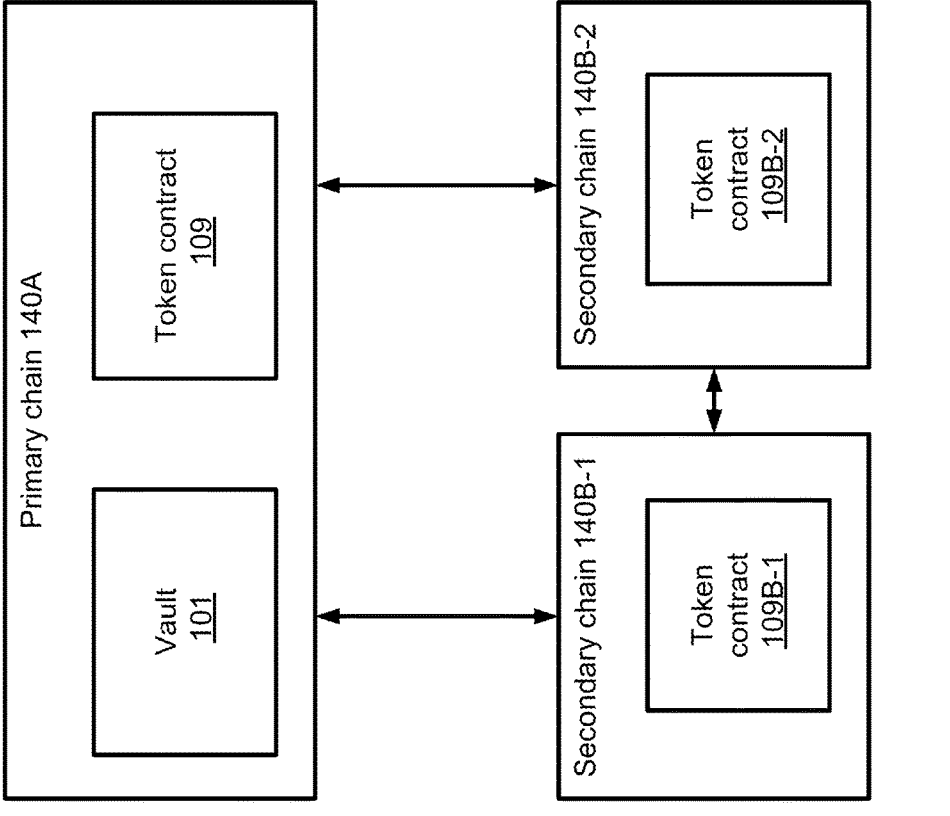

FIG. 1C is a diagram illustrating an example of system 100 as a multi-chain system, in accordance with some implementations. System 100 can include multiple blockchains, including primary chain 140A and one more secondary chains. Although two secondary blockchains 140B-1 and 140B-2 are described in this illustrative example, the number of secondary blockchains should not be considered limiting. In some implementations, primary chain 140A is a mainchain and each of secondary chains 140B-1 and 140B-2 is a sidechain.

Each local blockchain of system 100 can include a local token contract. Each local token contract of a local blockchain can track, for each attribution property, the local circulation of tokens having the attribution property circulating within the local blockchain. For example, as shown, primary chain 140A includes local token contract 109 for tracking, for each attribution property, the local circulation of tokens having the attribution property circulating within the primary chain 140A. As another example, as shown, secondary chain 140B-1 includes local token contract 109B-1 for tracking, for each attribution property, the local circulation of tokens having the attribution property circulating within secondary chain 140B-1. As yet another example, as shown, secondary chain 140B-2 includes local token contract 109B-2 for tracking, for each attribution property, the local circulation of tokens having the attribution property circulating within secondary chain 140B-2. The total local circulation for a local chain of system 100 refers to the sum of the local circulation for each attribution property.

As further shown, primary chain 140A can include vault 101. For example, the vault can be deployed as part of the token contract of the primary chain. In some implementations, only primary chain 140A includes a vault. For example, in some implementations, the diagram shown in FIG. 1A can represent primary chain 140A of system 100.

After a token is minted at vault 101, it can be transferred to the user account (e.g., digital wallet) of the token issuer on primary chain 140A, from where it can be transferred to another user account and/or local blockchain. More specifically, system 100 can support intrachain or local token transfers between a sender and a receiver with respect to a local blockchain, and interchain or cross-chain token transfers between a sender associated with one local blockchain and a receiver associated with another local blockchain. For example, a cross-chain token transfer can occur between primary chain 140A and one of the secondary chains 140B-1 or 140B-2, between secondary chain 140B-1 and secondary chain 140B-2, etc.

In addition to handling mint and redemption functions for each local blockchain (e.g., primary chain 140A and secondary chains 140B-1 and 140B-2), vault 101 can be used to track, for each attribution property, the global circulation of tokens having the attribution property within system 100. More specifically, the global token circulation of tokens having a given attribution property can be equal to the sum of each local token circulation of tokens having the given attribution property. The global token circulation of tokens having the given attribution property can be used to determine the proportion of tokens having the given attribution property in circulation with respect to the total number of tokens in circulation, which can be used to determine the amount of yield due to the corresponding token issuer. The total global circulation for system 100 refers to the sum of the global circulation for each attribution property.

To enable the vault 101 to track the global token circulation of tokens for each attribution property (e.g., which can be used to determine yield to be provided to token issuers), vault 101 can receive updates to local token circulation information from secondary chains to prevent divergence between the secondary blockchain token contract state and the vault state. As described above with reference to FIG. 1B, communication of a cross-chain transfer can be achieved using a cross-chain message (e.g., packet) that can send a set of data including the transfer payload from a source blockchain to a destination blockchain utilizing separate send and receive transactions.

However, it may be virtually impossible for vault 101 to track the global token attribution of the multi-chain system in a lossless way that is computationally efficient and scalable. This can be due at least in part to how computationally expensive it is to send cross-chain messages from a secondary chain to primary chain 140A to synchronize the local token attribution data stored in the token contract of the secondary chain with the global token attribution stored on vault 101. Additionally, this can be due at least in part to the frequency of token reattributions (e.g., the frequency of token transactions necessitating token reattributions). Accordingly, to make token reattribution with respect to cross-chain transfers scalable and practically usable, the number of synchronization messages sent to primary chain 140A to synchronize vault 101 should be reduced to reduce computational resource consumption.

However, decreasing the frequency of synchronization of vault 101 can lead to divergence between global token circulation(s) maintained by vault 101 of primary chain 140A and local token circulation(s) maintained by respective token contract(s) of local blockchains. Divergence with respect to a local blockchain can grow as a function of time between consecutive synchronizations between the state of the token contract on the local blockchain and the state of vault 101. This divergence can be unsafe, as vault 101 cannot accurately track the total global token circulation. This can, for example, unfairly influence distribution of yield due to token issuers based on their respective token contributions to the global token circulation.

System 100 can address at least these drawbacks by utilizing supplemental values that quantify such divergence, referred to herein as deltas (A). More specifically, each local token contract of a local blockchain can store, for each attribution property, a respective A to quantify divergence with respect to the attribution property. For example, for a given attribution property C, $\Delta_C$ can be defined as the difference between the local token circulation for attribution property C on a local blockchain, and the number of tokens having attribution property C on the local blockchain that are accounted for by vault 101 ("local mint of attribution property C"). A positive $\Delta_C$ means that there are more tokens having attribution property C in circulation than are accounted for by vault 101 (i.e., token surplus). A negative $\Delta_C$ means that there are fewer tokens having attribution property A in circulation than are accounted for by vault 101 (i.e., token deficit). If $\Delta_C$ is zero, then there is no divergence. The sum of all deltas across system 100 should equal zero, referred to as the delta-zero invariant.

A local token contract need not store, in addition to $\Delta_C$, the local mint of attribution property A or the local token circulation for attribution property C. However, in some implementations, at least the local token circulation for attribution property C can be stored in addition to $\Delta_C$ to enable users (e.g., token issuers) to view the local circulation for attribution property C.

System 100 can support various operations using delta values, such as cross-chain operations. One example of an operation is a cross-chain transfer. As previously described above, a cross-chain transfer of Q tokens having attribution property C from a sender on a source blockchain to a receiver on a destination blockchain can be broken up into a send transaction and a receive transaction. The send transaction moves the Q tokens into a cross-chain message (e.g., packet) to generate a transaction payload. The receive transaction moves the Q tokens having attribution property C of the transaction payload into the destination blockchain. As will be described in further detail below, the transaction payload can further include a set of data (e.g., $\Delta_C$) that is used to guarantee the delta-zero invariant on delivery to the destination blockchain if the transferred tokens are part of a surplus.

Another example of an operation is token reattribution. In the above example, assume that the sender has sent the Q of tokens having attribution property C to a receiver with designated attribution property D. That is, the Q tokens are non-conforming. In this example, it is assumed that the tokens having attribution property C are reattributed to attribution property D (e.g., instead of reattributing the token balance of the receiver to attribution property C). The token reattribution decreases $\Delta_C$ in the amount of Q, and increases $\Delta_D$ in the amount of Q to satisfy the delta-zero invariant. To illustrate, assume that there are 10 tokens having attribution property C and that these are reattributed to 10 tokens having attribution property D. The reattribution decreases $\Delta_C$ in this example by −10, and increases $\Delta_D$ in this example by 10.

Another example of an operation is token reminting ("reminting"). Reminting is a vault synchronization operation that enables a user account to report a token surplus of tokens having a given attribution property on a local blockchain to vault 101, so that vault 101 can remint a number of tokens having the given attribution property equal to the token surplus. This can increase the global circulation of tokens having the given attribution property, which can increase the amount of yield awarded to the token issuer. To maintain the delta-zero invariant, the token surplus needs to be offset by a combination of token deficits of one or more other attribution properties that having a total magnitude (e.g., absolute value) equal to the token surplus. For example, the combination of token deficits can be a single token deficit of a single attribution property having a magnitude equal to the token surplus, or a combination of multiple token deficits of multiple respective attribution properties that have a total magnitude equal to the token surplus. The remint operation can include a remint send transaction and a remint receive transaction. The remint send transaction can implement a cross-chain message having an argument that indicates the number of tokens having the selected attribution property to be reminted, the token surplus, and the combination of token deficits of one or more or other attribution properties that have a total magnitude equal to the token surplus. The remint receive transaction can implement a cross-chain message having an argument indicating the attribution property and the number of tokens to be reminted having the attribution property. In some implementations, multiple remint requests are encoded into the same cross-chain message for efficiency.

To illustrate using the previous example, assume that $\Delta_C$=−Q and $\Delta_D$=Q (i.e., $\Delta_C$ and $\Delta_D$ were each initially zero prior to the transfer). Since $\Delta_D$ is positive, there is a token surplus for attribution property D of Q tokens. The Q token surplus can enable the token issuer of attribution property D to remint Q tokens having attribution property D to increase the global circulation of tokens having attribution property D (which can increase the amount of yield awarded to the token issuer). To do so, the token issuer of attribution property D can send, from a secondary chain, a remint request to vault 101 on primary chain 140A to remint Q tokens having attribution property D. The remint send transaction include the number of tokens to be reminted (Q), the token surplus ($\Delta_D$) and a suitable combination of token deficits offsetting the token surplus. For example, the token issuer of attribution property D can select $\Delta_C$ as a single token deficit to offset $\Delta_D$. However, this should not be considered limiting.

Vault 101 can then execute the remint request by minting the number of tokens having the selected attribution property (e.g., Q tokens having attribution property D) and burning, for each of the one or more other attribution properties (e.g., attribution property C), a number of tokens equal to the respective token deficit for the other attribution property. The minting and burning operations can be performed in an atomic transaction. Vault 101 can then increase the global circulation of tokens having the selected attribution property by the corresponding number of tokens that were reminted (e.g., Q), and make corresponding reductions to the global circulation of tokens of the one or more other attribution properties. For example, if the token issuer selected $\Delta_C$ as a single token deficit to offset $\Delta_D$, then vault 101 can burn Q tokens having attribution property C and reduce the global circulation of tokens having attribution property C by Q.

A fee can be charged to a user account that has chosen to execute the remint function. A portion of this fee can be used to compensate the one or token issuers corresponding to the one or more other attribution properties for the burning of their tokens (e.g., the token issuer of attribution property C). Another portion of this fee can be used to compensate an administrator of system 100.

In summary, in some implementations, a cross-chain transaction from a source blockchain to destination blockchain (e.g., token transfer or remint) includes sending a token surplus and a matching token deficit from the source blockchain to the destination blockchain so that the net change in delta is zero. However, a cross-chain message used to perform a cross-chain transaction (e.g., transfer send message or remint send transaction message) can only hold a finite amount of data. Using the previous example of reminting, the token issuer of attribution property D can choose to offset the token surplus of $\Delta_D$ (Q) with the token deficit of $\Delta_C$ (–Q), which will fit in the remint send transaction message. However, in some situations, the token surplus can be large and there may be a bunch of small token deficits (e.g., on the order of tens of thousands) that exist. A cross-chain message may not have the capacity to store all of this information. In these situations, the token issuer may be forced to remint only a portion of the token surplus that the token issuer is entitled to remint. This means that the token issuer may need to send multiple remint requests in order to remint the entire token surplus, which would consume more computational resources and would be more financially costly for the token issuer (since the token issuer pays a fee to execute a remint request). This can negatively impact user experience and deter some users from reminting.

To address at least these drawbacks, in some implementations, the token contract on a local blockchain can store a delta tracker value (Ae). When an amount of token surplus flows out of a source blockchain as part of a cross-chain transaction (i.e., there is a decrease in in the total token surplus on the source blockchain), the amount of token surplus that left the source blockchain is matched by a corresponding increase in $\Delta_\theta$ stored on the token contract of the source blockchain. When the amount of token surplus from the source blockchain flows into a destination blockchain as part of the cross-chain transaction (i.e., there is an increase in the total token surplus on the destination blockchain), the amount of token surplus that has been added to the destination blockchain is matched by a corresponding decrease in $\Delta_\theta$ stored on the token contract of the destination blockchain. $\Delta_\theta$ on a local blockchain measures the difference between the token deficit and the token surplus on the local blockchain. More specifically, a positive $\Delta_\theta$ on a local blockchain means that the difference between the token deficit and the token surplus on the local blockchain is positive (i.e., the local blockchain collectively has more token deficits than token surpluses). A negative $\Delta_\theta$ on a local blockchain means that the difference between the token deficit and the token surplus on the local blockchain is negative (i.e., the local blockchain collectively has more token surpluses than token deficits). Accordingly, $\Delta_\theta$ can provide an indication of imbalances that exists across blockchains.

As an illustrative example, assume that secondary blockchain 140B-1 initially has 100 tokens of attribution property B (B|100), $\Delta_B$ on secondary blockchain 140B-1 ($\Delta_{B_1}$) is zero. Additionally, assume that the source blockchain initially has zero tokens of attribution property R (R|0) and $\Delta_R$ on the source blockchain ($\Delta_{R_1}$) is zero.

Now, the source blockchain performs a reattribution operation to reattribute all of the tokens having attribution property B into tokens having attribution property R (B|0 and R|100). The reattribution operation also reduces $\Delta_{B_1}$ by 100 ($\Delta_{B_1}=-100$) and increases $\Delta_{R_1}$ by 100 ($\Delta_{R_1}=100$).

Now, a cross-chain transfer operation can be performed to transfer all of the tokens having attribution property A from secondary blockchain 140B-1 to secondary blockchain 140B-2. The cross-chain transfer operation generates a delta tracker value on secondary blockchain 140B-1 ($\Delta_{\theta_1}$) equal to 100 and a delta tracker value on secondary blockchain 140B-2 ($\Delta_{\theta_2}$) equal to –100 to offset the transfer of the token surplus $\Delta_{R_1}=100$ to secondary blockchain 140B-2 ($\Delta_{R_2}=100$). If $\Delta_R$ in this example was less than or equal to zero, then there would be no need to generate $\Delta_{\theta_{Src}}$ and $\Delta_{\theta_{Dst}}$.

Since $\Delta_{R_2}=100$ is positive (i.e., a token surplus), the token issuer corresponding to attribution property R has the ability to remint up to 100 tokens having attribution property R on secondary blockchain 140B-2. In order to do so, the token issuer would need to offset $\Delta_{R_2}$ with an equal amount of token deficit, which can be derived from token deficits for one or more other attribution properties on the destination blockchain. $\Delta_R$ cannot be offset with $\Delta_{\theta_2}$. However, in this example, we are assuming that there are no token deficits on secondary blockchain 140B-2 from which to offset the token surplus. That is, the negative value of $\Delta_{\theta_2}$ can make it impossible to remint a token surplus. Additionally, $\Delta_{\theta_1}$ can continue to grow unabated over time.

To solve such problems, delta tracker value (Ae) synchronization can be performed. The goal of $\Delta_\theta$ synchronization is to make the $\Delta_\theta$ stored on the token contract of each local blockchain of system 100 as close to zero as possible. For example, $\Delta_\theta$ synchronization can be performed by using a cross-chain message to move, from a local blockchain that has a positive $\Delta_\theta$, some amount of token deficit and an offsetting amount of the positive $\Delta_\theta$ to a local blockchain that has a negative $\Delta_\theta$ (or vice versa).

To illustrate, referring back to the previous illustrative example, $\Delta_{B_1}=-100$ and $\Delta_{\theta_1}=100$ can be sent from secondary blockchain 140B-1 to secondary blockchain 140B-2 using a cross-chain message, resulting in $\Delta_{B_1}=0$, $AO_1=0$, $\Delta_{B_2}=-100$ and $\Delta_{\theta_2}=0$. This can then allow the token issuer to offset $\Delta_{R_2}=100$ with $\Delta_{B_2}=-100$ to enable the token issuer to perform the remint operation.

The power of using $\Delta_\theta$ can become apparent in situations in which there may be a large number of small token deficits within a blockchain (e.g., in the above example, 100 individual token deficits of –1 instead of the single token deficit of –100). The delta value tracker A functions as a convenience tool that reduces the number of computationally expensive tasks that would be performed by a user account (e.g., a user account of an end user using a token to interact with a token issuer's application).

The responsibility to eventually pair token surpluses with token deficits using cross-chain operations can be offloaded to an administrator of system 100. For example, the administrator can identify the most efficient cross-chain operations to minimize cost. Fees paid to the administrator of system 100 can go toward the costs of handling these cross-chain operations. In some implementations, system 100 automatically identifies opportunities for $\Delta_\theta$ synchronization and/or transfers of delta values to enable reminting. Further details regarding implementing cross-chain transfers, $\Delta_\theta$ synchronization, recoloring and reminting operations will be described below with reference to FIG. 1D.

Figure 1D:
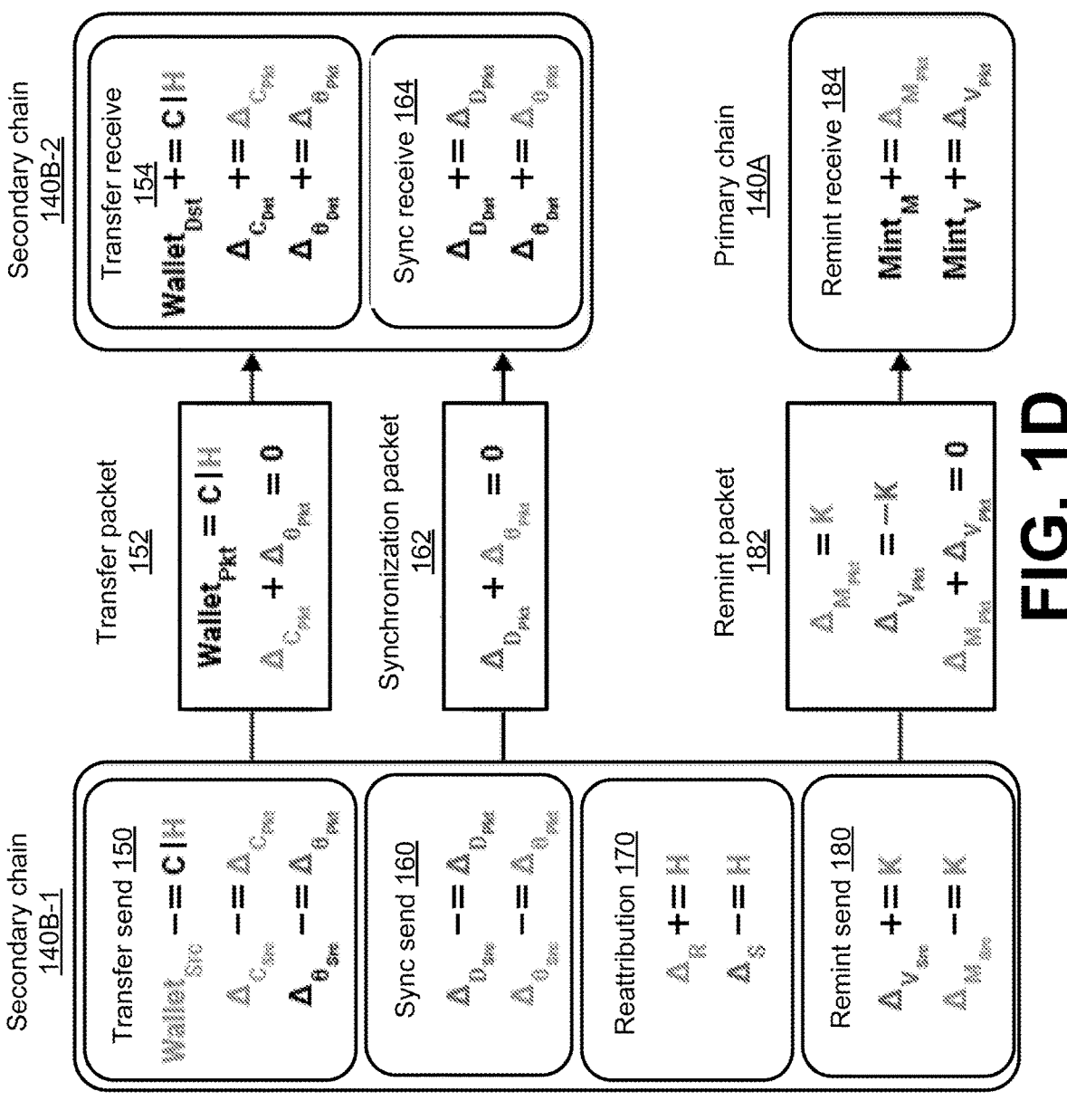

FIG. 1D is a diagram illustrating example operations that can be performed within system 100, in accordance with some implementations. As shown, system 100 can include primary chain 140A, secondary chain 140B-1 and secondary chain 140B-2, as described above with reference to FIG. 1C.

One operation that can be performed within system 100 is a cross-chain transfer operation to transfer a number of tokens from a source digital wallet ("Wallet$_{Src}$") linked to secondary chain 140B-1 to a destination digital wallet ("Wallet$_{Dst}$") linked to secondary chain 140B-2. Initially, the source digital wallet of secondary chain 140B-1 can include a token balance of H tokens having attribution property C (i.e., C|H), secondary chain 140B-1 can have a source delta value for attribution property C (i.e., $\Delta_{C_{Src}}$), and secondary chain 140B-1 can have a source delta tracker value (i.e., $\Delta_{\theta_{Src}}$). During transfer send transaction 150 to generate transfer packet 152, H tokens, $\Delta_{C_{Src}}$ and $\Delta_{\theta_{Src}}$ are debited from secondary chain 140B-1 (e.g., the token contract of secondary chain 140B-1) and added to transfer packet 152 as a transaction payload. More specifically, the transaction payload includes a token balance of H tokens having attribution property C (i.e., Wallet$_{Pkt}$=C|H), $\Delta_{C_{Pkt}}$ and $\Delta_{\theta_{Pkt}}$. In this example, $\Delta_{C_{Src}}$ and $\Delta_{C_{Pkt}}$ are positive values (i.e., token surplus) and $\Delta_{\theta_{Pkt}}$ is a negative value equal in magnitude to $\Delta_{C_{Pkt}}$(i.e., indicating a net token deficit on secondary chain 140B-1), such that $\Delta_{C_{Pkt}}+\Delta_{\theta_{Pkt}}$=0. During transfer receive transaction 154, the transaction payload of transfer packet 152 is applied to secondary chain 140B-2. More specifically, on the token contract of secondary chain 140B-2, Wallet$_{Dst}$ is increased by H, $\Delta_{C_{Dst}}$ is increased by $\Delta_{C_{Pkt}}$ and $\Delta_{\theta_{Dst}}$ is decreased by $\Delta_{\theta_{Pkt}}$.

Another operation that can be performed within system 100 is a $\Delta_\theta$ synchronization operation to synchronize a source delta tracker value ($\Delta_{\theta_{Src}}$) of secondary chain 140B-1 and a destination delta tracker value ($\Delta_{\theta_{Dst}}$) of secondary chain 140B-2. Initially, secondary chain 140B-1 can have a source delta value for attribution property D (i.e., $\Delta_{D_{Src}}$), and $\Delta_{\theta_{Src}}$. During synchronization send ("sync send") transaction 160 to generate synchronization packet 162, $\Delta_{D_{Src}}$ and $\Delta_{\theta_{Src}}$ are debited from secondary chain 140B-1 (e.g., the token contract of secondary chain 140B-1) and added to synchronization packet 162 as a transaction payload. More specifically, the transaction payload includes $\Delta_{D_{Pkt}}$ and $\Delta_{\theta_{Pkt}}$. In this example, $\Delta_{D_{Src}}$ and $\Delta_{D_{Pkt}}$ are negative values (i.e., token deficit) and $\Delta_{\theta_{Pkt}}$ is a positive value equal in magnitude to $\Delta_{C_{Pkt}}$(i.e., indicating a net token surplus on secondary chain 140B-1), such that $\Delta_{D_{Pkt}}+\Delta_{\theta_{Pkt}}$=0. During synchronization receive ("sync receive") transaction 154, the transaction payload of synchronization packet 162 is applied to secondary chain 140B-2. More specifically, on the token contract of secondary chain 140B-2, $\Delta_{D_{Dst}}$ is reduced by $\Delta_{D_{Pkt}}$ and $\Delta_{\theta_{Dst}}$ is increased by $\Delta_{\theta_{Pkt}}$. In some implementations, synchronization packet 162 supports multiple $\Delta_\theta$ synchronization operations to improve computational efficiency. In some implementations, a reward is provided to a user who initiates the $\Delta_\theta$ synchronization operation. Such an incentive structure can enable $\Delta_\theta$ synchronization to be implemented as a decentralized process.

Another operation that can be performed within system 100 is reattribution operation 170. As described above, a reattribution operation can be performed in order to change an attribution property of tokens as part of a token transfer. For example, as shown, secondary chain 140B-1 can have a source delta value for attribution property R ($\Delta_R$) and a source delta value for attribution property S ($\Delta_S$). During reattribution operation 170, H tokens are reattributed from attribution property S to attribution property R, increasing $\Delta_R$ and decreasing $\Delta_S$ on the token contract of secondary chain 140B-1.

Another operation that can be performed within system 100 is a remint operation. Initially, secondary chain 140B-1 can have a source delta value for attribution property M (i.e., $\Delta_{M_{Src}}$) and a combined source delta value (i.e., $\Delta_{V_{Src}}$). $\Delta_{M_{Src}}$ is a positive value K (i.e., token surplus), and $\Delta_{V_{Src}}$ is a negative value equal to –K. More specifically, $\Delta_{V_{Src}}$ can be obtained by combining token deficits of one or more additional properties such that they equal –K. During remint send transaction 180 to generate remint packet 182, $\Delta_{M_{Src}}$ and $\Delta_{V_{Src}}$ are debited from secondary chain 140B-1 (e.g., the token contract of secondary chain 140B-1) and added to remint packet 182 as a transaction payload. More specifically, the transaction payload includes $\Delta_{M_{Pkt}}$=K and $\Delta_{V_{Pkt}}$=–K, such that $\Delta_{M_{Pkt}}+\Delta_{V_{Pkt}}$=0. During remint receive transaction 184, the transaction payload of remint packet 182 is applied to primary chain 140A. More specifically, on the vault, the global circulation of attribution property M (Mint$_M$) is increased by $\Delta_{D_{Pkt}}$ and $\Delta_{\theta_{Dst}}$ is increased by $\Delta_{\theta_{Pkt}}$.

Implementations described herein can provide a number of technical advantages. For example, as described above, by implementing blockchain-based token attribution using a lossy token attribution method described herein instead of a more computationally complex lossless token attribution method, implementations described herein can reduce resource consumption (e.g., processor and/or memory resource consumption). Various aspects of the above referenced methods and systems are described in further detail herein below by way of examples, rather than by way of limitation.

Due to the asynchronous nature of message (e.g., packet) transmission it may be possible in rare cases for system 100 to reach a situation where the transaction payload of a remint message cannot be applied to vault 101 without reducing a global circulation of tokens having an attribution property below zero. The following is an example of such a scenario.

Initially, assume that the global circulation of tokens of attribution property B is 100 (B|100), and the global circulation of tokens of attribution properties G and R are each zero (G|0 and R|0). Then, B|100 is recolored to G|100, resulting in $\Delta_G$=100 and $\Delta_B$=–100. A first remint operation (R1) is performed to remint 100 tokens having attribution property G by combining $\Delta_G$=100 and $\Delta_B$=–100. Then, G|100 is recolored to B|100, resulting in $\Delta_B$=100 and $\Delta_G$=–100. A second remint operation (R2) is performed to remint 100 tokens having attribution property B by combining $\Delta_B$=100 and $\Delta_G$=–100. Then, B|100 is recolored to R|100, resulting in $\Delta_R$=100 and $\Delta_B$=–100. A third remint operation (R3) is performed to remint 100 tokens having attribution property R by combining $\Delta_R$=100 and $\Delta_B$=–100. Due to asynchrony, it is not guaranteed that R1 will be delivered to the vault before R2, but R2 cannot be applied to the vault before R1 due to the initial state of G|0. In addition, if R3 is delivered an executed before R1 and R2, neither R1 nor R2 can ever be executed.

There are various solutions to this type of asynchronization problem. One solution is to use a vector clock to enforce strictly-happens-before ordered execution of remint requests. Another solution is to aggregate un-executable remint requests into a shared remint pool to be applied after the aggregated remints result in a consistent state on vault 101. Due to network overhead of using vector clocks, the latter solution of using a shared remint pool may be more computationally efficient.

It may be the case that a blockchain of system 100 is malicious or faulty. Additionally or alternatively, it may be the case that the network itself can be malicious or faulty. For example, the loss of network liveness can result in the indefinite lockup of tokens, delta values, etc. in a cross-chain message.

One potential attack vector is referred to as "flash reminting." In flash reminting, a token issuer can gain a disproportionate distribution by acquiring a token surplus for a very short period of time via a flash loan, and reminting that token surplus. System 100 can implement a set of safeguards to prevent flash reminting. For example, the set of safeguards can include timelocks and/or reminting fees. Regarding timelocks, system 100 can enforce that tokens added to a surplus can only be reminted after a timelock has expired (e.g., 1 block), and also that an increased magnitude of deficit must also wait for a timelock before being used as a counterparty for reminting. This can prevent flash borrowers from griefing token issuers that offer loan services. Regarding reminting fees, system 100 can tune the reminting fees to be high enough such that token issuers are not incentivized to remint unless they are confident that their mint will last for at least a certain number of distribution periods, which is not expected to be the case for flash reminters.

Another potential attack vector is referred to as the "fugitive deficit attack." In a fugitive deficit attack, an entity can consolidate their token deficits along with a corresponding delta value tracker on a single blockchain, and then do a send sync transaction upon observing a remint request that uses their token attribution's token deficit as a counterparty. This can prevent the remint request from slashing the attacker's deficit and can cause grief due to failed remint requests. The fugitive deficit attack can require that the entity hold a significant number of assets to prevent the delta tracker value on the blockchain from becoming negative (and thus blocking their attempt to move token deficits). However, in theory, this would allow a single entity that controls two token attributions to double the yield of their underlying funds. This problem can be fixed using a centralized control mechanism to temporarily block the movement of token deficits for specific token attribution properties, or by restricting the routing of delta tracker value flows to prevent the creation of a tight loop on a small set of low-cost blockchains. In practice, there may also be a threshold for delta tracker value synchronization, such as small deficits can be created using a small amount of capital and would cost the synchronizing entity potentially large fees for the source and destination transactions (on top of the cross-chain messaging fees). In addition, the source chain and the destination chain for a delta tracker value synchronization request should be different to prevent attacks from trying to hide their token deficits.

In some implementations, system 100 is implemented by a decentralized exchange (DEX). A DEX, also known as a bridge, is a peer-to-peer (P2P) electronic platform that facilitates token transfers between digital wallets connected to different blockchains (i.e., cross-chain swaps). For example, some bridges can utilize smart contract-governed consensus protocols to facilitate the automatic minting of digital assets on a blockchain.

Some bridges can suffer from a variety of drawbacks. For example, some existing bridges can rely on intermediary chains and protocol-specific tokens, such as intermediary tokens or wrapped tokens, to facilitate transactions. Only a protocol-specific token is minted on the blockchain as opposed to the actual digital asset that the user wants. The user must then exchange the protocol-specific token for the actual digital asset in an additional transaction. These additional transactions and use of protocol-specific tokens and intermediary chains introduce overhead in what should be a single seamless transaction. As another example, some existing bridges can support only a small, limited network of blockchains.

To address at least the above deficiencies, cross-chain messaging of system 100 can be implemented using a set of cross-chain communication protocols ("communication protocols") to support trustless omnichain interoperability. A communication protocol can enable cross-chain communication of data items, such as messages or transactions, within a network. For example, a communication protocol described herein can support direct cross-chain messaging and/or cross-chain transactions. That is, a communication protocol described herein need not rely on any intermediary transactions, intermediary blockchains and/or intermediary tokens to facilitate the transmission of data items. A communication protocol described herein can be defined by a unified protocol, as opposed to an ad-hoc collection of messaging services, in order to serve diverse trust and security requirements of a wide variety of blockchain applications. A set of communication protocols described herein can provide a foundation to implement other network primitives, such as multicast (e.g., through iterated unicast) and/or publish/subscriber messaging.

Aspects and implementations of the set of communication protocols described herein can provide a number of technical advantages. For example, the set of communication protocols can enable the performance of direct cross-chain transactions. By using off-chain entities to retrieve and send transaction proofs and block headers, respectively, to a destination blockchain to determine whether a transaction originating from a source blockchain is stably committed on the source blockchain, the endpoints of the communication protocol located on the source blockchain and the destination blockchain can designed to be lightweight, and can run on computationally expensive blockchains without incurring prohibitive computational costs. Additionally, by enabling cross-chain digital asset transactions (e.g., transfers, swaps and/or exchanges), implementations described herein can maximize the utility of digital assets by enabling applications on every supported blockchain to use the digital asset, increase digital asset market liquidity, and digital asset utility. Further details regarding the set of communication protocols will now be described below with reference to FIGS. 2A-5D.

Figure 2A:
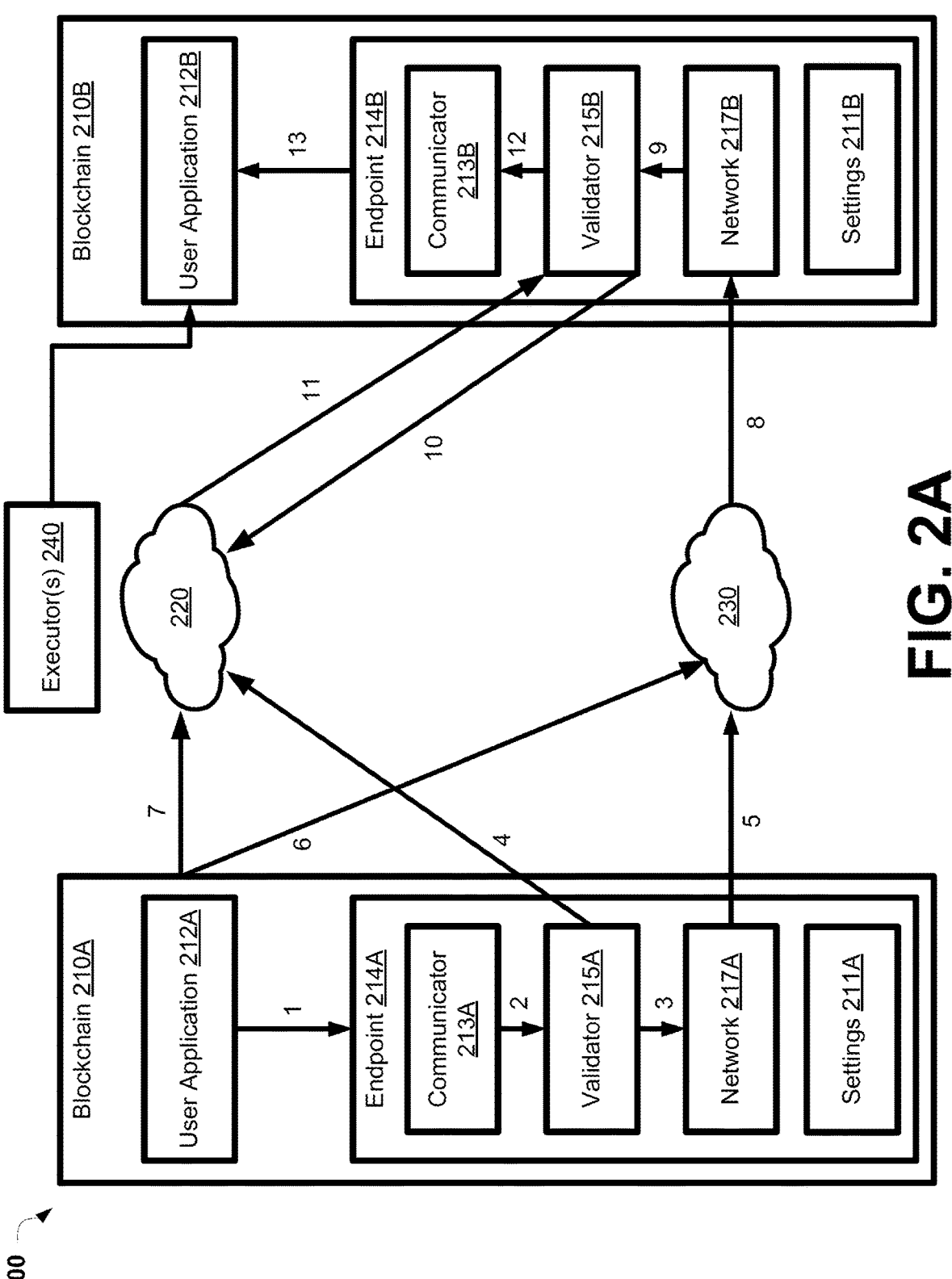
FIGS. 2A-2B are diagrams of an example computer system including a trustless omnichain interoperability protocol platform, in accordance with some implementations.
Figure 2B:
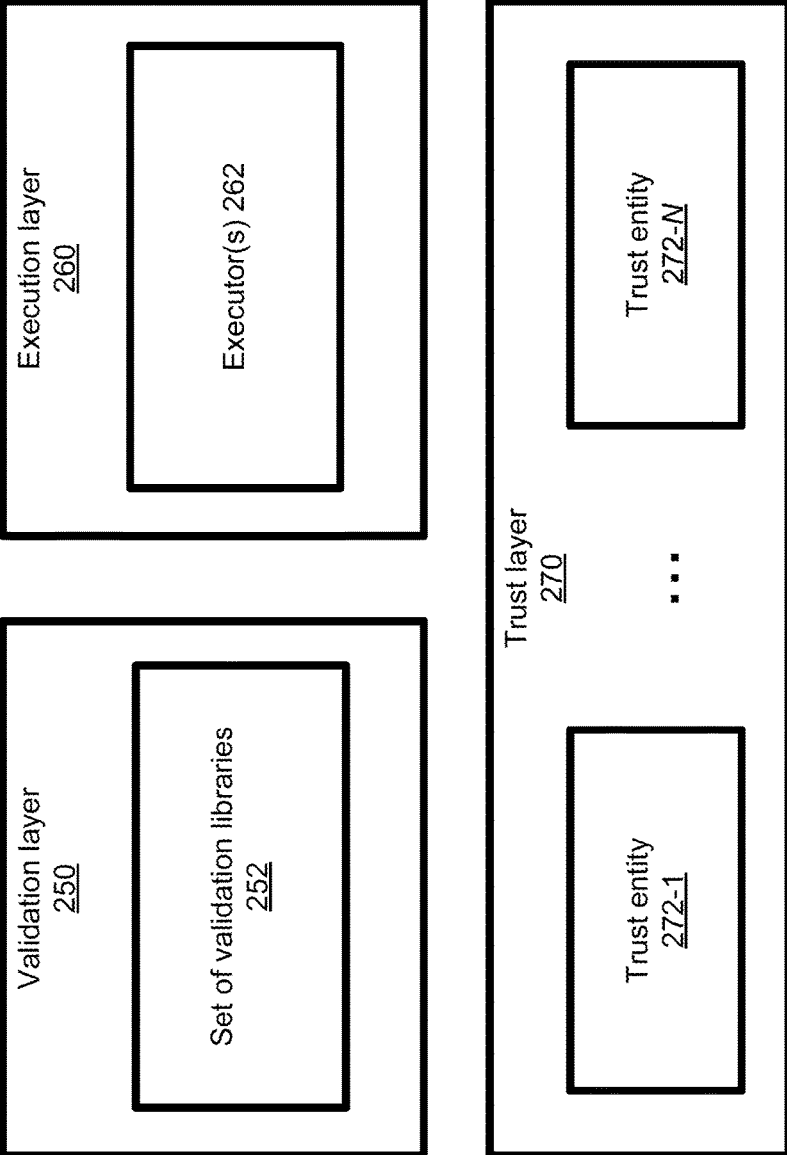

FIGS. 2A-2B are diagrams of an example computer system ("system") 200 including a trustless omnichain interoperability protocol platform, in accordance with some implementations. System 200 can implement a communication protocol to enable a cross-chain bridge ("bridge") that can be used to send a cross-chain data item (e.g., message or transaction) from source blockchain 210A to destination blockchain 210B of a network. For example, blockchain 210A can correspond to sender 110 of FIG. 1A, and blockchain 210B can correspond to receiver 120 of FIG. 1A.

More specifically, the data item can be sent from a node maintaining blockchain 210A to a node maintaining blockchain 210B. A network can refer to a collection of blockchains that have functionality to support a protocol implemented by a platform. Each node of a network can be connected to other nodes of the network via a pair of unidirectional "connections," over which data items (e.g., messages or native digital assets) can be transferred directly from the maintaining blockchain 210A to the node maintaining blockchain 210B. Each connection can be backed by liquidity assigned to blockchain 210B to facilitate withdrawals by the user as part of the communication protocol. Thus, the amount of available liquidity assigned to blockchain 210B can be viewed as the "bandwidth" of the connection between blockchain 210A and blockchain 210B. Allowing cross-chain transactions to flow freely provides opportunities for users to consolidate fragmented pockets of liquidity, while also making full use of applications on separate blockchains.

System 200 can enable a clean and minimal single-transaction cross-chain swap that does not utilize intermediary tokens. Generally, the transmission of a data item from blockchain 210A to blockchain 210B can be divided into multiple tasks, including an execution task and a validation task. A communication protocol described herein can separate these tasks into separate modules, which can then be unified through a flexible, customizable platform interface to support cross-chain data transfer protocols. For example, a platform interface can allow user applications associated with respective blockchains (e.g., located on the respective blockchains) to easily configure functionality, cost, and/or security. Accordingly, a communication protocol described herein can be generalized and modular to enable flexibility and customization depending on use case (e.g., a platform can define configuration space supporting a set of configurations).

For example, blockchain 210A can include or otherwise be associated with user application 212A and endpoint 214, and blockchain 210B can include or otherwise be associated with user application 212B and endpoint 214B. Endpoint 214A and endpoint 214B can enable a user to send and/or receive a data item using the communication protocol. In some implementations, endpoint 214A and endpoint 214B are each implemented as a smart contract or a series of smart contracts.

Endpoints 214A and 214B handle logic (e.g., high-level exchange logic) of the communication protocol for sending a data item from blockchain 210A to blockchain 210B. Endpoints, such as endpoint 214A and endpoint 214B, are lightweight clients that exist on their respective blockchains, and any blockchain with an endpoint can conduct cross-chain transactions involving any other blockchain with an endpoint using the platform. In some implementations, an endpoint is implemented as a series of smart contracts. Accordingly, the endpoints can create a fully-connected network in which every node of system 200 has a direct connection to every other node of system 200.

Endpoints 214A and 214B can appear to user applications 212A and 212B, respectively, as ordered channels between blockchains 210A and 210B. User applications 212A and 212B can interact via endpoints 214A and 214B, respectively, to implement a communication protocol. For example, endpoint 214A can receive a data item (e.g., message or transaction) to be sent to blockchain 210B (e.g., a user application located on the destination blockchain), and send the data item to blockchain 210B in accordance with the communication protocol. As another example, endpoint 214B can receive a data item sent by blockchain 210A in accordance with the communication protocol.

In some implementations, endpoint 214A includes set of communication protocol settings 211A, communicator component 213A, validator component 215A and network component 217A. In some implementations, endpoint 214B includes set of communication protocol settings 2111B, communicator component 213B, validator component 215B and network component 217B. This design can enable the addition of support for new blockchains without modifying components 213A through 217A and/or components 213B through 217B.

Set of communication protocol settings 211A and set of communication protocol settings 211B can each include a validation library selected from a set of validation libraries supported by system 200. A validation library is responsible for enabling validation of a data item being sent from a source blockchain to a destination blockchain. Blockchains 210A and 210B can be configured with the same validation library to support the transmission of a data item in accordance with the communication protocol. For example, a validation library can be implemented as an auxiliary smart contract that defines how cross-chain communication should be handled in accordance with the communication protocol. Each validation library can have an associated version number. For example, the set of validation libraries can include multiple versions of at least one validation library. The set of libraries can include one or more libraries that can handle message (e.g., packet) generation, encoding and/or decoding of smart contract address information, computation involved in validating the transaction proof, etc. For example, a library can handle Merkle-Patricia tree validation. As another example, a library can be a zero-nonce proof library. User applications 212A and 212B can specify any version of a validation library to enable data item transmission for a particular use case. System 200 can provide the ability to swap new validation libraries to achieve particular implementations of the communication protocol. For example, user applications 212A and 212B can specify any version of a validation library to enable data item transmission for a particular use case. In some implementations, the validation library is selected based on risk tolerance. Further details regarding validation libraries will be described below with reference to FIG. 2B.

As another example, set of communication protocol settings 211A and set of communication protocol settings 211B can further include a selection of a set of off-chain entities to facilitate data transfer between blockchain 210A and blockchain 210B based on the selected validation library (e.g., as defined by the selected validation library). For example, the selected validation library can indicate the set of off-chain entities. A set of off-chain entities can include at least two entities that are guaranteed not to collude to enable trustless communication of a data item without the use of any intermediary chains, intermediary or wrapped tokens, etc. As shown, the set of off-chain entities includes trust entity 220, trust entity 230 and set of executors 240. In some implementations, the trust entity 220 and trust entity 230 are selected based on risk tolerance. More specifically, trust entity 220 and trust entity 230 are guaranteed not to collude, in order to enable trustless communication of data between blockchain 210A and blockchain 210B without any intermediary chains, wrapped tokens, etc. Set of communication protocol settings 211A and set of communication protocol settings 211B can be the same to implement the communication protocol between blockchain 210A and blockchain 210B (e.g., the same library). To ensure trustless valid delivery of a data item (e.g., message) sent from blockchain 210A to blockchain 210B using the communication protocol, there must not be any collusion between trust entity 220 and trust entity 230. To prevent collusion between trust entity 220 and trust entity 230, trust entity 220 and trust entity 230 can be independent entities. For example, at least one of trust entity 220 or trust entity 230 can be a third-party entity that is not affiliated with the platform. Further details regarding executors and trust entities will be described below with reference to FIG. 2B.

Endpoint 214A and endpoint 214B can initialize a communication protocol to communicate a data item during a cross-chain transaction. In some implementations, initializing the communication protocol includes configuring set of communication protocol settings 211A and set of communication protocol settings 2111B, respectively. In some implementations, configuring set of communication protocol settings 211A and set of communication protocol settings 211B includes endpoint 214A receiving a customized settings configuration from user application 212A and endpoint 214B receiving the customized settings configuration from user 212B, and endpoint 214A and endpoint 214B configuring set of communication protocol settings 211A and set of communication protocol settings 211B, respectively, in accordance with the customized settings configuration. In some implementations, configuring set of communication protocol settings 211A and set of communication protocol settings 211B includes endpoint 214A and endpoint 214B each configuring set of communication protocol settings 211A and set of communication protocol settings 211B, respectively, in accordance with a default configuration provided by the platform. For example, this can happen if user application 212A and user application 212B select the default configuration, or if endpoint 214A and endpoint 214B do not receive a customized settings configuration from user application 212A and user application 212B, respectively. Accordingly, during initialization of the communication protocol, a set of communication protocol settings can be selected from a range of communication protocol settings with different sets of characteristics depending on the user applications 212A and 212B.

After the communication protocol is initialized, the data item to be sent in accordance with the set of communication protocol settings. To ensure valid delivery, a data item can be delivered if (e.g., if and only if) the transaction is determined to be valid (e.g., valid and committed). The set of communication protocol settings can be used to ensure that the transaction is valid. A description of the steps involved in the valid delivery of a data item using system 200 will now be described.

In this illustrative example, trust entity 220 is a transaction proof entity and that trust entity 230 is a block header entity. A transaction proof entity is a service that provides a mechanism to independently produce a transaction proof for a specified transaction. In some implementations, a transaction proof entity is a third-party service. In some implementations, a transaction proof entity is provided by the platform itself. A block header entity is a service that provides a mechanism to produce a block header from one blockchain and send the block header to another blockchain. The block header is a component of the current block that includes information about the current block (i.e., block metadata). For example, the block header can include at least one of: a timestamp, a digest of the current block (e.g., hash of the current block), a digest of the header of the previous block (e.g., hash of the header of the previous block), a cryptographic nonce value, a Merkle tree root, etc. In some implementations, a block header entity is a third-party service not affiliated with the platform. However, such an example should not be considered limiting. User application 212A can execute a series of actions as part of a transaction T uniquely identified by transaction identifier t. The format of transaction identifier t can vary depending on the type of blockchain 210A. A step included in transaction T is the transmission of a data item over the communication protocol with a valid delivery condition on transaction T.

More particularly, at step 1, user application 212A can send a request including a set of parameters to communicator component 213A. In some implementations, the set of parameters includes transaction identifier t, a global identifier pointing to a smart contract on blockchain 210B ("dst"), and a user payload (e.g., any data that user application 212A wants to send to user application 212B). In some implementations, the set of parameters include a set of transaction proof entity arguments. The set of transaction proof entity arguments can include information (e.g., payment information) in the event that user application 212A wishes to use a reference transaction proof entity.

At step 2, communicator component 213A generates a data item, and sends the data item along with auxiliary information to validator component 215A. In some implementations, the data item is a message. For example, the data item can be a packet. In some implementations, the data item generated by communicator component 213A includes dst and the user payload. For example, the data item generated by communicator component 213 can be represented as a packet Packet (dst, user payload). In some implementations, the auxiliary information includes transaction identifier t and the set of transaction proof entity arguments.

At step 3, validator component 215A notifies network component 217A that the block header for the current block on blockchain 210A needs to be sent to blockchain 210B. For example, validator component 215A can send transaction identifier t and dst to network component 217A, and the receipt of transaction identifier t and dst is what notifies network component 217A that the block header for the current block on blockchain 210A needs to be sent to blockchain 210B.

At step 4, validator component 215A notifies transaction proof entity 220 that the transaction proof for transaction T needs to be retrieved (e.g., fetched) and sent to blockchain 210B. For example, validator component 215A can forward the data item and the auxiliary information to transaction proof entity 220, and the receipt of the data item and the auxiliary information is what notifies transaction proof entity 220 that the transaction proof for transaction T needs to be retrieved and sent to blockchain 210B.

At step 5, network component 217A notifies block header entity 230 to retrieve (e.g., fetch) the block header for the current block on blockchain 210A and send the block header to blockchain 210B. For example, network component 217A can sends dst and a block identifier (ID) of the current transaction to block header entity 230, and the receipt of dst and the block ID is what notifies block header entity 230 to retrieve the block header for the current block on blockchain 210A and send the block header to blockchain 210B.

At step 6, block header entity 230 reads the block header of the current block from blockchain 210A. At step 7, transaction proof entity 220 reads the transaction proof associated with transaction T (proof (t)) from blockchain 210A. Transaction proof entity 220 can further store proof (t) off-chain. In some implementations, step 6 and step 7 are performed asynchronously.

At step 8, block header entity 230 confirms that the current block of blockchain 210A is stably committed on blockchain 210A. The mechanism for confirming that the current block of blockchain 210A is stably committed on blockchain 210A varies per blockchain. In some implementations, confirming that the current block of blockchain 210A is stably committed on blockchain 210A includes determining that a number of block confirmations satisfies a threshold condition. For example, determining that a number of block confirmations satisfies a threshold condition can include determining that the number of block confirmations is greater than or equal to a threshold number of block confirmations. In some implementations, the threshold number of block confirmations is 15. After confirming that the current block of blockchain 210A is stably committed on blockchain 210A (e.g., determining that the number of block confirmations satisfies a threshold condition), block header entity 230 sends the blocker header to network component 217B.

At step 9, network component 217B sends a digest of the block header to validator component 215B. For example, the digest of the block header can be a hash of the block header. At step 10, validator component 215B sends the digest of the block header to transaction proof entity 220.

At step 11, upon receiving the digest of the block header, transaction proof entity 220 sends, to validator component 215B, a list of tuples that match the current block of blockchain 210A. More specifically, the list of tuples can be a list of any data item, transaction identifier t, proof (t) tuples that match the current block of blockchain 210A. In the event that multiple users simultaneously send data items between endpoints 214A and 214B, there may be multiple data items and associated transaction proofs within the same block.

At step 12, validator component 215B determines whether transaction T is valid. In some implementations, determining whether transaction T is valid includes determining whether transaction T is valid and committed. For example, validator component 217 can determine whether transaction T is valid by determining whether the received transaction proof matches the block header stored by network component 217B (i.e., the transaction proof and the block header are determined to be in agreement). If the received transaction proof and the block header do not match, then transaction T is determined to be invalid and/or uncommitted and the data item is discarded.

Otherwise, the data item (e.g., Packet (dst, user payload)) is sent to communicator component 213B. Since the transaction process matches the block header, the data item is sent with the guarantee that the transaction is stably committed on blockchain 210A. Then, at step 13, communicator component 213B sends the data item to user application 212B. Accordingly, due to the lack of collusion between the set of off-chain entities, the communication protocol can guarantee that a transaction with respect to blockchain 210B will be paired with a valid, committed transaction with respect to blockchain 210A without involving any indirect methods (e.g., intermediary chains and/or wrapped tokens).

Executing smart contracts on blockchains (e.g., layer 1 blockchains) can be cost prohibitive, especially as the amount of stored data increases. To solve this problem, the task of retrieving transaction proofs is delegated transaction proof entity 220 and the task of retrieving block headers is delegated to block header entity 230. Transaction proof entity 220 and block header entity 230 are off-chain entities that do not collude. This results in endpoint 214A and endpoint 214B being lightweight and cost effective, even on expensive blockchains. An example of a packet that can be used to implement the communication protocol will now be described in detail below with reference to FIG. 3.

Referring to FIG. 2B, system 200 can include a set of layers to support the sending and/or receiving of a data item in accordance with the communication protocol. For example, validation layer 250 handles cybersecurity operations. To do so, validation layer 250 can include set of validation libraries 252 to handle validating a data item to be sent by blockchain 210A, sending the data item to execution layer 260 and/or trust layer 270, validating the data item at blockchain 210B and/or transmitting the data item to blockchain 210B.

Each validation library of set of validation libraries 252 can implement a data item validation mechanism having an associated trust characteristic and/or cost characteristic. For example, each validation library of set of validation libraries 252 can implement a data item validation mechanism that conforms to an application programming interface (API) of the platform to establish a connection to an endpoint. This can allow the communication protocol to avoid the trap of validation lock-in. In some implementations, validation layer 250 is append-only. In some implementations, set of validation libraries 252 is an append-only registry of validation libraries. In some implementations, each validation library of set of validation libraries 252 is immutable. Set of validation libraries 252 can include one or more validation libraries that can handle message (e.g., packet) generation, encoding and/or decoding of smart contract address information, computation involved in validating the transaction proof, etc. For example, a validation library can handle Merkle-Patricia tree validation. As another example, a validation library can handle zero-nonce proof validation. Each validation library of set of validation libraries 252 can be identifiable through a unique validation library identifier (ID). In some implementations, the validation library ID is paired with a version (e.g., semantic version) of the validation library.

A validation library can be selected from set of validation libraries 252 to handle transmission of a data item (e.g., message) by blockchain 210A and/or receipt of the data item by blockchain 210B. For example, user application 212A and user application 212B can configure a validation library via endpoint 214A and endpoint 214B, respectively, as part of a set of configuration settings. The selection of the validation library can be based on a trust characteristic and/or a cost characteristic (e.g., based on much must trust and/or cost user application 212A and/or user application 212B is willing to tolerate for sending/receiving the data item). A data item can only be sent from blockchain 210A to blockchain 210B if blockchain 210A and the blockchain 210B each are configured with the same validation library (e.g., the same version of the same library). In some implementations, a validation library is accessed directly on-chain by address. User application 212A and user application 21B can each swap out a currently selected validation library for a new validation library.

Execution layer 260 can include set of executors 262 including one or more executors that can be used to implement one or more non-validation tasks. A non-validation task refers to any task that does not directly pertain to validation. Set of executors 262 can minimize responsibilities of validation layer 250 (e.g., responsibilities of set of validation layers 252) by enabling the separation of non-validation tasks from validation tasks. The separation of non-validation tasks from validation tasks enables improved flexibility without compromising security. Set of executors 262 can be implemented and/or deployed by any entity, and can perform any non-validation task so long as the non-validation task does not interfere with a validation task that is implemented by a validation library. In some implementations, set of executors 262 includes multiple executors that each implement one or more respective non-validation task. The operation and implementation of set of executors 262 can be democratized, allowing any entity to execute its own executor of set of executors 262, and by extension allowing any user application to add custom logic to be executed as part of the data item transaction. In some implementations, set of executors 262 implement a security mechanism to detect a malicious data item originating from blockchain 210A by inspecting data originating from blockchain 210A, filter the malicious data item and/or block the malicious data item from being sent to blockchain 210B. The security mechanism can be used to increase defense against potentially security vulnerabilities (e.g., exploits) due to, e.g., protocol-level exploits and/or application-level exploits (e.g., due to a bug in an application-level smart contract).

Trust layer 270 can include trust entity 272-1 through trust entity 272-N. A set of trust entities can be selected among trust entity 272-1 through trust entity 272-N to handle transmission of a data item from blockchain 210A to blockchain 210B in accordance with a communication protocol. The set of trust entities and the executor(s) of set of executors 262 can collectively form a set of off-chain entities. For example, a user application can configure the set of off-chain entities via an endpoint as part of a set of configuration settings. The selection of the set of off-chain entities, such as the set of trust entities, can be based on a trust characteristic and/or a cost characteristic (e.g., based on much must trust and/or cost user application 212A and/or user application 212B is willing to tolerate for sending/receiving the data item). To ensure trustless valid delivery of a data item sent from blockchain 210A to blockchain 210B using the communication protocol, there must not be any collusion between trust entities. To prevent collusion between trust entities, each trust entity of the set of trust entities can be an independent trust entity. For example, at least one trust entity of the set of trust entities can be a third-party entity that is not affiliated with the platform.

A high-level description of the operation of system 200 will now be described. User application 212A can send a set of parameters for transmission of a data item to endpoint 214A. In some implementations, the data item is a message. For example, the data item can be a packet. In some implementations, sending the set of parameters includes generating a request by encoding the set of parameters into the request, and sending the request to endpoint 212A.

In some implementations, the set of parameters includes a user payload and a set of auxiliary parameters. The user payload can include any data that user application 212A wants to send to user application 212B via the data item (e.g., message). The set of auxiliary parameters can include at least one of: a validation library, a version of the validation library, a nonce value, a source blockchain ID of blockchain 210A, a source blockchain address of blockchain 210A, an address of user application 212A, a destination blockchain ID of blockchain 210B, a destination blockchain address of blockchain 210B, an address of user application 212B, an address of each off-chain entity that is being selected, a message offset, a set of executor arguments, etc. The set of executor arguments can specify which executor(s) of set of executors 262 to invoke and the arguments to pass during the invocation of the executor(s).

Upon receiving the set of parameters from user application 212A, endpoint 214A can forward the set of parameters to validation layer 250. Validation layer 250 can select, based on the set of parameters, a validation library from set of validation libraries 252 to handle transmission of the data item. The validation library can then generate a data item based on the set of parameters. In some implementations, the validation library emits a data item that encodes parameters for the set of off-chain entities identified from the set of parameters (e.g., executor(s) of set of executors 262 and off-chain entities selected from trust entity 272-1 through 272-N).

The validation library can send the data item to the set of off-chain entities identified from the set of parameters. The set of off-chain entities can cause the data item to be sent to blockchain 210B for validation using the corresponding validation library. Upon successful validation, the data item can be sent to endpoint 214B. Endpoint 214B can order data items received from the validation library located blockchain 210B, buffer data items that are received out-of-order, etc. The endpoint 214B can send, to user application 212B, the data item from the endpoint located on the destination blockchain. Additionally, set of executors 262 can execute any relevant actions based on the set of parameters, and send corresponding executor data items (e.g., executor messages) to user application 212B.

Figure 3:
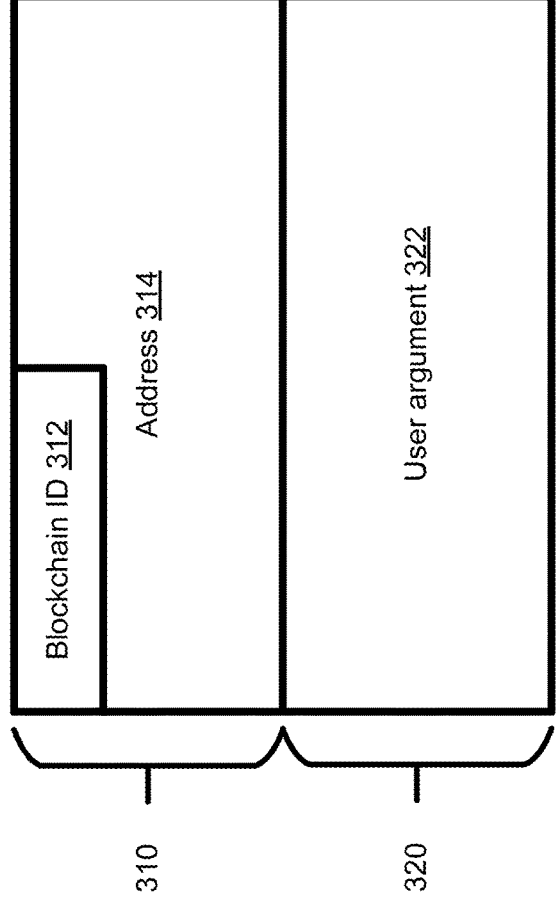
FIG. 3 is a diagram of an example layout of an endpoint packet, in accordance with some implementations.

FIG. 3 is a diagram of an example layout of an endpoint message 300, in accordance with some implementations. For example, endpoint message 300 can be a packet. The format of endpoint message 300 can vary depending on the source blockchain (e.g., blockchain 210A of FIG. 2) and the destination blockchain (e.g., blockchain 210B of FIG. 2). As shown, endpoint message 300 can include routing information 310, and user payload 320 including user argument 322 sent by a user application (e.g., user application 212A of FIG. 2). In some implementations, routing information 310 includes blockchain ID 312 and address 314. Blockchain ID 312 is a unique identifier for a blockchain in the communication protocol system. Address 314 is an address of the recipient smart contract on the destination blockchain. For example, address 314 can have a size of 20 bytes.

A communication protocol described above with reference to FIGS. 1A-3 can be used to implement a cross-chain bridge that deals exclusively in native digital assets. Contrary to some bridge designs that issue wrapped tokens or go through intermediary sidechains, a bridge built using a communication protocol described herein to send data items between blockchains can have liquidity pools exist on both blockchains. A user can simply deposit a native digital asset in one liquidity pool and withdraw a native digital asset from another liquidity pool. The communication protocol can enable direct bridges (e.g., 1:1 pricing), automated market making (e.g., ab=k pricing), etc. The guarantee of trustless valid delivery that the communication protocol provides can enable a wide range of cross-chain applications.

For example, a communication protocol described above with reference to FIGS. 1A-3 can be used to implement a multi-chain yield aggregator. Yield aggregators typically operate within the confines of single-chain ecosystems. One key weakness of these single chain yield aggregation systems is that they cannot take advantage of any yield opportunities outside of their current ecosystem, potentially missing out on many of the best yields. Implementing a multi-chain yield aggregator with the communication protocol described above can allow for strategies that tap into the best opportunities across all ecosystems, increasing access to high-yield opportunities and enabling users to take advantage of market inefficiencies. A multi-chain yield aggregator would be strictly better than a single-chain yield aggregator. For example, in the worst case, the strategy would degrade to taking advantage of opportunities on only one blockchain, and in the best case it would have exponentially more opportunities to choose from.

As another example, a communication protocol described above with reference to FIGS. 1A-3 can be used to implement a multi-chain lending protocol. For example, the communication protocol can enable a lending protocol that would allow a user to keep an entire digital asset base in-place on one blockchain, lend out the digital asset base, and borrow directly from a different blockchain. This can eliminate intermediary costs such as bridge and swap fees.

The ability to perform direct cross-chain transactions as described above with reference to FIGS. 1A-3 can enable the development and use of complex cross-chain or interchain applications without sacrificing trustlessness or introducing complex intermediary chains and/or smart contracts.

Examples of such cross-chain applications include cross-chain bridges, multi-chain yield aggregators, and cross-chain lending protocols. For example, using a communication protocol described herein, users can freely move liquidity between blockchains, allowing for a single pool of liquidity to take part in multiple decentralized finance (DeFi) applications across different blockchains and ecosystems without having to go through third-party systems or intermediary tokens and/or chains.

The configuration of the set of communication protocol settings, including the validation library and the set of off-chain entities, can be used to solve a variety of technical challenges. One technical challenge that can be solved is related to cybersecurity and trust in data item validation. A user application can require a level of trust for validating a data item that crosses through a set of off-chain entities. The level of trust can have an inherently reciprocal relation with the cost of validating the data item. For example, there may be a desire to pay a larger fee to minimize the level of trust required and, by extension the degree of risk, to transfer a large quantity of digital assets (e.g., tokens) from a source blockchain to a destination blockchain. To address this technical challenge, the set of communication protocol settings can enable trust-configurability for validating data items using the communication protocol. For example, the validation library and the set of off-chain can be selected to satisfy a trust characteristic and/or a cost characteristic for validating a data item being sent from a source blockchain to a destination blockchain for a user application.

Another technical challenge that can be solved is extensibility. Generally, user applications should be updated to continue to meet ever-changing demands of users. It can be important to extend support to new blockchains that are added to the network, validation mechanisms, and messaging primitives. Moreover, the communication protocol should allow optimizations to existing code (e.g., debugging) in a manner that precludes the possibility of compromising the cost and/or performance of existing applications.

To address extensibility, the modular design of the set of communication protocol settings including validation libraries can enable the communication protocol to be quickly and easily extended to include new blockchains of the network on demand. A validation library can be immutable when added to the set of validation libraries, which can be used to guarantee that user applications can use a given version of a given validation library without modifying and/or deprecating the underlying code. Moreover, an executor can be used to implement any non-validation tasks (e.g., a task that does not directly pertain to validation). For example, any non-validation task can be factored out of the validation library and handled by the executor, allowing for rapid development and deployment of features without going through rigorous auditing that may be required to introduce a new version of a validation library. The executor can be implemented and/or deployed by any entity, and can perform any non-validation task so long as the non-validation task does not interfere with a validation task that is implemented by the validation library. Accordingly, the set of validation libraries can provide a high degree of freedom in adding and/or upgrade features, and the executor can be leveraged to minimize validation library responsibilities.

Yet another technical challenge that can be solved is cybersecurity against protocol-level vulnerabilities and application-level vulnerabilities. A common theme in the blockchain ecosystem is that the security or trustworthiness of a smart contract is directly related to how long it has been in-use without being compromised. As such, it can be important for existing, well-established code to remain usable in an unmodified state indefinitely. In-place modification of existing code during updates can result in a loss of cybersecurity, which can be unacceptable for some user applications. To balance the need for backwards compatibility with the need to continually update and improve code, implementations described herein can enable validation libraries to be added or updated while also enabling user selection between a new improved validation library, or an older, well-established validation library. A validation library described herein can be append-only to protect user applications and/or associated users from silent modifications to the validation library. This append-only design of disallowing in-place updates for validation libraries is atypical of other communication protocols that support cross-chain data item transfers and, coupled with the application-specific validation library configuration, can enable improved cross-chain data transfer security. Moreover, the endpoints described herein can be immutable to prevent any entity, including the platform supporting the endpoints, from bypassing data item validation using validation libraries. While it may be theoretically possible for a user application to configure a malicious validation library, existing user applications that have already configured a specific validation library will be left unaffected by the malicious validation library. In addition, on-chain configuration changes can undergo a peer-review process and test period before they are deployed, reducing the likelihood that a user application can configure a malicious validation library in the first place. By allowing a high degree of configurability and democratizing the operation of the off-chain infrastructure, a platform described herein can provide improved cybersecurity and communication-protocol-level configurability. In addition, users can execute their own off-chain entities for relaying data items to connect to existing validation libraries to further control the required level of trust for respective user applications. Further, a platform described herein can provide an off-chain security mechanism to protect against application-level security vulnerabilities.

Figure 4:
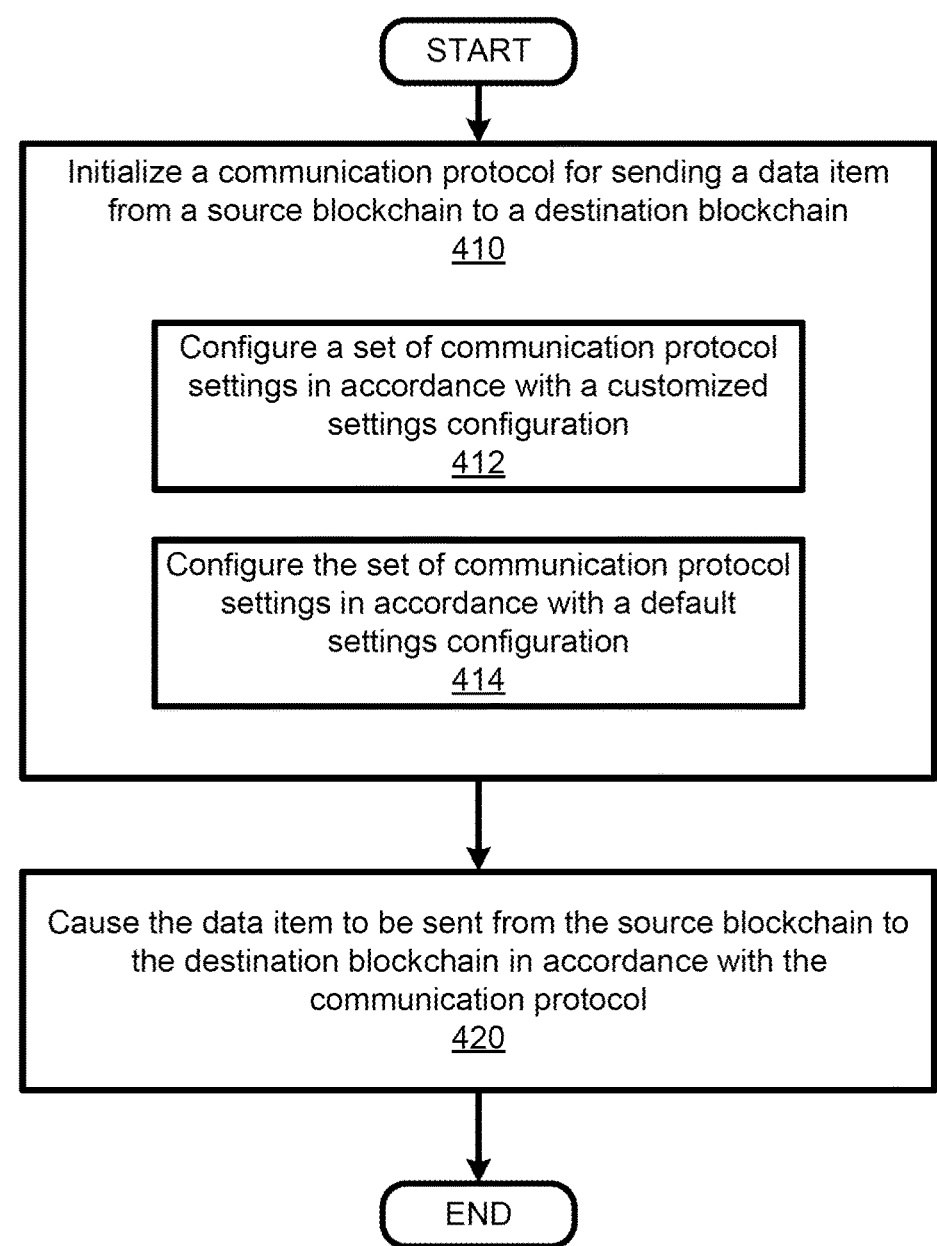
FIGS. 4-5D are flow diagrams of example methods for implementing trustless omnichain interoperability protocol platforms, in accordance with some implementations.

FIG. 4 depicts a flow diagram of an example method 400 for implementing a trustless omnichain interoperability protocol platform, in accordance with some implementations. For example, method 400 may be performed by endpoint 214A as shown in FIG. 2A. Method 400 may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 400.

At operation 410, processing logic initiates a communication protocol for sending a data item from a source blockchain supported by a platform to a destination blockchain supported by the platform. For example, the data item can be sent from a source node maintaining the source blockchain to a destination node maintaining the destination blockchain. In some implementations, the data item is a message. For example, the data item can be a packet.

Initializing the communication protocol can include configuring a set of communication protocol settings. In some implementations, the set of communication protocol settings includes a validation library selected from a set of validation libraries. For example, the set of validation libraries can include one or more validation libraries that are swappable (e.g., the validation library can be replaced with a new validation library). In some implementations, the set of communication protocol settings includes a set of off-chain entities selected to facilitate the sending of the data item. The set of off-chain entities can be selected in accordance with the validation library. For example, the set of off-chain entities can include a set of trust entities. A first trust entity of the set of trust entities does not collude with a second trust entity of the set of trust entities. The source blockchain and the destination blockchain are configured with at least some of the same set of communication protocol settings (e.g., the same validation library).

In some implementations, initializing the communication protocol includes, at operation 412, configuring a set of communication protocol settings in accordance with customized settings configuration. For example, configuring the set of communication protocol settings in accordance with the customized settings configuration can include receiving a customized settings configuration from a user application, and configuring the set of settings in accordance with the customized settings configuration received from the user application. The user application can be associated with source blockchain or the destination blockchain. The customized settings configuration can be received as part of a set of parameters associated with a data item to be transmitted from the source blockchain to the destination blockchain.

In some implementations, initializing the communication protocol includes, at operation 414, configuring the set of communication protocol settings in accordance with a default settings configuration. The default settings configuration can be provided by the platform. For example, this can happen if the user applications select the default configuration (e.g., as part of the set of parameters received from the user applications), or if the endpoints do not receive a customized settings configuration from the user applications.

In some implementations, initializing the communication protocol includes obtaining, from the user application, a set of parameters. In some implementations, obtaining the set of parameters includes receiving a request from the user application. For example, the request can be generated by encoding the set of parameters. In some implementations, the set of parameters includes a user payload and a set of auxiliary parameters. The user payload can include any data that the user application wants to send to the user application associated with the destination blockchain via the data item. The set of auxiliary parameters can include at least one of: a validation library, a version of the validation library, a nonce value, a source blockchain ID, a source blockchain address, an address of the user application, a destination blockchain ID, a destination blockchain address, an address of the user application associated with the destination blockchain, an address of each off-chain entity that is being selected, a message offset, a set of executor arguments, etc. The set of executor arguments can specify the set of executors and the arguments to pass during the invocation the set of executors.

At operation 420, processing logic causes the data item to be sent from the source blockchain to the destination blockchain in accordance with the communication protocol. For example, causing the data item to be sent in accordance with the communication protocol can include causing the data item to be sent in accordance with the set of communication protocol settings including the validation library and the set of off-chain entities. The set of trust entities of the set of off-chain entities can enable trustless valid delivery of the data item. The set of executors of the set of off-chain entities can implement non-validation tasks, which can enable separation of validation tasks implemented by the validation library from the non-validation tasks.

In some implementations, causing the data item to be sent from the source blockchain to the destination blockchain includes causing the validation layer to be selected from a set of validation layers. For example, causing the validation layer to be selected from the set of validation layers can include forwarding the set of parameters to a validation layer. The validation library can then generate the data item based on the set of parameters. In some implementations, the validation library emits a data item that encodes parameters for the set of off-chain entities identified from the set of parameters (e.g., set of executors and set of trust entities). The validation library can send the data item to the set of off-chain entities identified from the set of parameters. The set of trust entities can cause the data item to be sent to the corresponding validation library located on the destination blockchain. The validation library located on the destination blockchain can then attempt to validate the data item. Upon successful validation, the data item can be sent to the endpoint located on the destination blockchain. The endpoint located on the destination blockchain can order data items received from the validation library located on the destination blockchain, buffer data items that are received out-of-order, etc. The endpoint located on the destination blockchain can send, to the user application associated with the destination blockchain, the data item from the endpoint located on the destination blockchain. Additionally, the set of executors can execute any relevant actions based on the set of parameters, and send corresponding executor data items (e.g., executor messages) to the user application associated with the destination blockchain. Further details regarding operations 410-420 are described above with reference to FIGS. 2A-3.

An illustrative example of a method for implementing a trustless omnichain interoperability protocol platform (e.g., causing a message to be sent in accordance with the communication protocol) will now be described in further detail below with reference to FIGS. 5A-5D.

FIG. 5A depicts a flow diagram of an example method 500A for implementing a trustless omnichain interoperability protocol platform, in accordance with some implementations. For example, method 500A may be performed by endpoint 214A as shown in FIG. 2. Method 500A may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500A.

At operation 510A, processing logic receives, from a first user application associated with a source blockchain, a request associated with a transaction. The source blockchain is maintained by a set of nodes of a first blockchain network. For example, the first user application can execute a series of actions as part of the transaction. The request can include a set of parameters.

In some implementations, the set of parameters includes a transaction identifier corresponding to the transaction, a global identifier corresponding to a destination blockchain, and a user payload. The format of the transaction identifier can vary depending on the source blockchain type. In some implementations, the global identifier is indicative of a smart contract on the destination blockchain. For example, the global identifier can point to the smart contract on the destination blockchain. The user payload can include any data that the user application wants to send to a second user application associated with the destination blockchain. In some implementations, the set of parameters further includes a set of transaction proof entity arguments. The set of transaction proof entity arguments can include information in the event that the first user application wishes to use a reference transaction proof entity.

At operation 520A, processing logic obtains a packet and auxiliary information. For example, obtaining the packet and auxiliary information can include generating the packet in response to receiving the request, and sending the packet with the auxiliary information for validation. In some implementations, the packet includes the global identifier and the user payload. In some implementations, the auxiliary information includes the transaction identifier and the set of transaction proof entity arguments.

At operation 530A, processing logic determines that a block header for a current block on the source blockchain is to be sent to a destination blockchain. The destination blockchain is different from the source blockchain and is maintained on a set of nodes of a second blockchain network different from the first blockchain network. For example, determining that the block header is to be sent to the destination blockchain can include receiving a notification that the block header needs to be sent to the destination blockchain. In some implementations, receiving the notification that the block header needs to be sent to the destination blockchain includes receiving the transaction identifier and the global identifier. For example, the transaction identifier and the global identifier can be validated prior to receiving the notification that the block header needs to be sent to the destination blockchain.

At operation 540A, processing logic causes a set of entities to obtain a set of data including the block header and a transaction proof for the transaction. For example, processing logic can cause the set of entities to obtain the set of data in response to determining that the block header is to be sent to the destination blockchain. In some implementations, the set of entities includes a transaction proof entity and a block header entity.

For example, causing the set of entities to obtain the set of data include the block header and the transaction proof can include notifying the transaction proof entity that the transaction proof needs to be retrieved (e.g., fetched) and sent to the destination blockchain. In some implementations, notifying the transaction proof entity that the transaction proof needs to be retrieved and sent to the destination blockchain includes sending the packet and the auxiliary information to the transaction proof entity, and the receipt of the packet and the auxiliary information is what notifies the transaction proof entity that the transaction proof needs to be retrieved and sent to the destination blockchain. Further details regarding the transaction proof entity are described above with reference to FIGS. 2A-2B and will be described below with reference to FIG. 5B.

As another example, causing the set of entities to obtain the set of data include the block header and the transaction proof can include notifying the block header entity that the block header needs to be retrieved (e.g., fetched) and sent to the destination blockchain. In some implementations, notifying the block header entity that the block header needs to be retrieved and sent to the destination blockchain includes sending the global identifier and a block ID to the block header entity, and the receipt of the global identifier and the block ID is what notifies the block header entity that the block header needs to be retrieved and sent to the destination blockchain. Further details regarding the block header entity are described above with reference to FIGS. 2A-2B and will be described below with reference to FIG. 5C.

As described above with reference to FIGS. 2A-2B and as will be described in further detail below with reference to FIG. 5D, an endpoint on the destination blockchain can receive the set of data including the block header and the transaction proof, and use the set of data to determine whether the transaction is valid. Upon determining that the transaction is valid, the endpoint on the destination blockchain can send the packet to the second user application. Further details regarding operations 510A-540A are described above with reference to FIGS. 2A-3 and will be described in further detail below with reference to FIGS. 5B-5D.

FIG. 5B depicts a flow diagram of an example method 500B for implementing a trustless omnichain interoperability protocol platform, in accordance with some implementations. For example, method 500B may be performed by transaction proof entity 220 as shown in FIG. 2A. Method 500B may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500B.

At operation 510B, processing logic receives, from a first endpoint located on a source blockchain, a notification to obtain a transaction proof for a transaction associated with the source blockchain. In some implementations, receiving the notification to obtain the transaction proof includes receiving a packet and auxiliary information. In some implementations, the packet includes a global identifier corresponding to a destination blockchain and a user payload. In some implementations, the global identifier is indicative of a smart contract on the destination blockchain. For example, the global identifier can point to the smart contract on the destination blockchain. In some implementations, the user payload includes data that a first user application associated with the source blockchain wants to send to a second user application associated with the destination blockchain. In some implementations, the auxiliary information includes a transaction identifier of the transaction and a set of transaction proof entity arguments.

At operation 520B, processing logic obtains the transaction proof from the source blockchain. For example, the transaction proof can be obtained from the source blockchain in response to receiving the notification to obtain the transaction proof. In some implementations, obtaining the transaction proof from the source blockchain includes reading the transaction proof from the source blockchain. In some implementations, obtaining the transaction proof from the source blockchain further includes storing the transaction proof off-chain.

At operation 530B, processing logic receives, from a second endpoint located on a destination blockchain, data associated with a block header of a current block of the source blockchain. In some implementations, the data associated with the block header is a digest of the block header. For example, the data associated with the block header can be a hash of the block header.

At operation 540B, processing logic sends, to the second endpoint, a list of tuples that match the current block of the source blockchain. For example, the list of tuples can be sent to the second endpoint in response to receiving the data associated with the block header. More specifically, the list of tuples can be a list of any packet, transaction identifier, and transaction proof tuples that match the current block of the source blockchain.

As described above with reference to FIGS. 2A-2B and as will be described in further detail below with reference to FIG. 5D, the second endpoint can determine whether the transaction is valid based on the list of tuples. In response to determining that the transaction is valid, the second endpoint can send the packet to the second user application. Further details regarding operations 510B-540B are described above with reference to FIGS. 2A-5A and will be described in further detail below with reference to FIGS. 5C-5D.

Figure 5C:
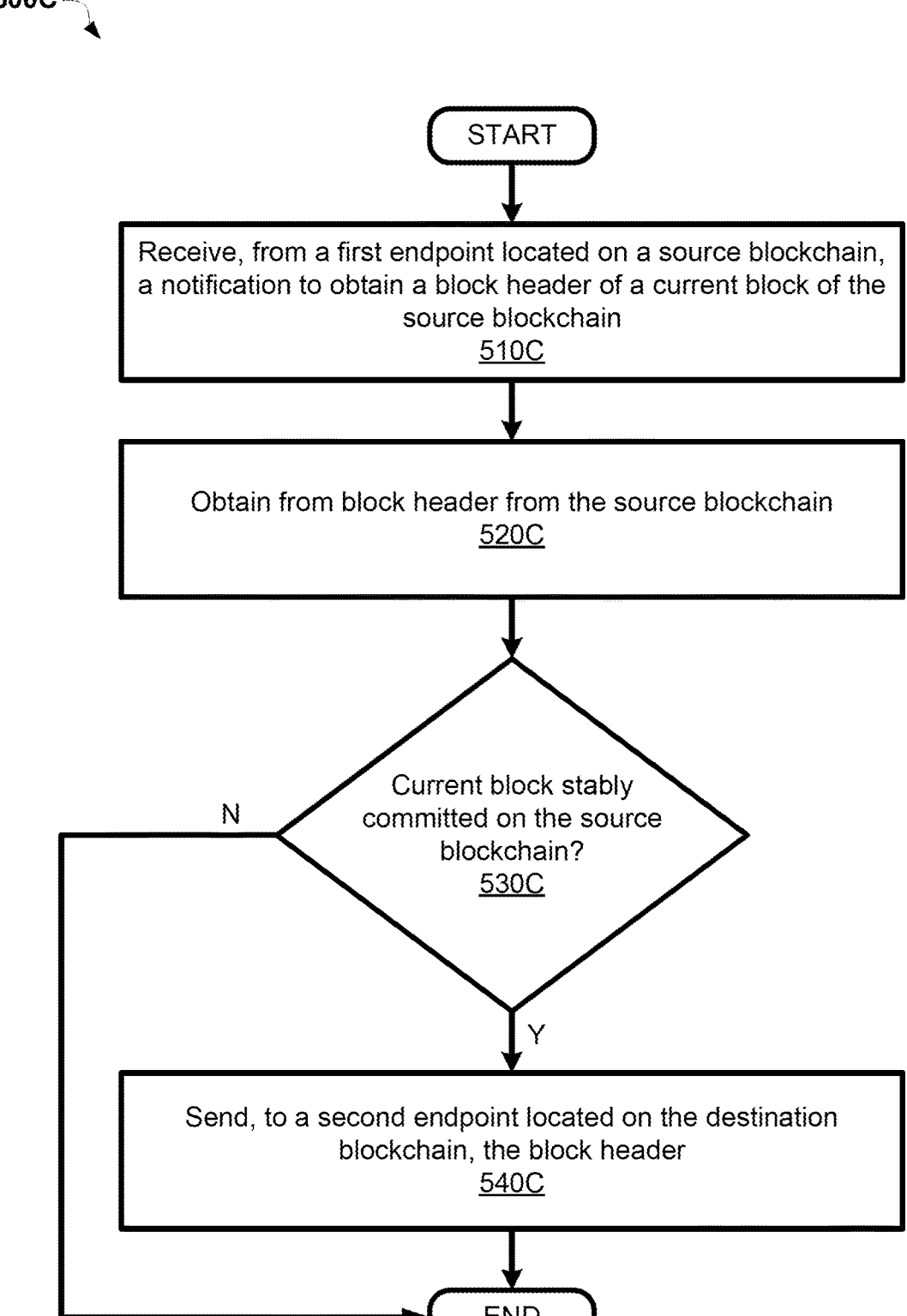

FIG. 5C depicts a flow diagram of an example method 500C for implementing a trustless omnichain interoperability protocol platform, in accordance with some implementations. For example, method 500C may be performed by block header entity 230 as shown in FIG. 2A. Method 500C may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500C.

At operation 510C, processing logic receives, from a first endpoint located on a source blockchain, a notification to obtain a block header of a current block of the source blockchain. In some implementations, receiving the notification to obtain the block header includes receiving a global identifier corresponding to a destination blockchain and a block ID of the transaction. In some implementations, the global identifier is indicative of a smart contract on the destination blockchain. For example, the global identifier can point to the smart contract on the destination blockchain.

At operation 520C, processing logic obtains the block header from the source blockchain. For example, the block header can be obtained from the source blockchain in response to receiving the notification to obtain the block header. In some implementations, obtaining the block header from the source blockchain includes reading the block header from the source blockchain. In some implementations, obtaining the block header from the source blockchain further includes storing the block header off-chain.

At operation 530C, processing logic determines whether the current block is stably committed on the source blockchain. The mechanism for determining whether the current block is stably committed on the source blockchain varies per blockchain. In some implementations, determining whether the current block is stably committed on the source blockchain includes determining whether a number of block confirmations satisfies a threshold condition. For example, determining whether a number of block confirmations satisfies a threshold condition can include determining that the number of block confirmations is greater than or equal to a threshold number of block confirmations. In some implementations, the threshold number of block confirmations is 15.

In response to determining that the current block is stably committed on the source blockchain, at operation 540C, processing logic sends the block header to a second endpoint located on the destination blockchain.

As described above with reference to FIGS. 2A-2B and 5B and as will be described in further detail below with reference to FIG. 5D, the second endpoint can then generate data associated with the block header (e.g., a digest of the block header), and send the data associated with the block header to a transaction proof entity. The second endpoint can then receive, from the transaction proof entity, a list of tuples that match the current block of the source blockchain. The second endpoint can determine whether the transaction is valid based on the list of tuples. In response to determining that the transaction is valid, the second endpoint can send a packet to a user application associated with the destination blockchain. In some implementations, the packet includes the global identifier and a user payload. In some implementations, the user payload includes data that a user application associated with the source blockchain wants to send to the user application associated with the destination blockchain. Further details regarding operations 510C-540C are described above with reference to FIGS. 2A-5B and will be described in further detail below with reference to FIG. 5D.

Figure 5D:
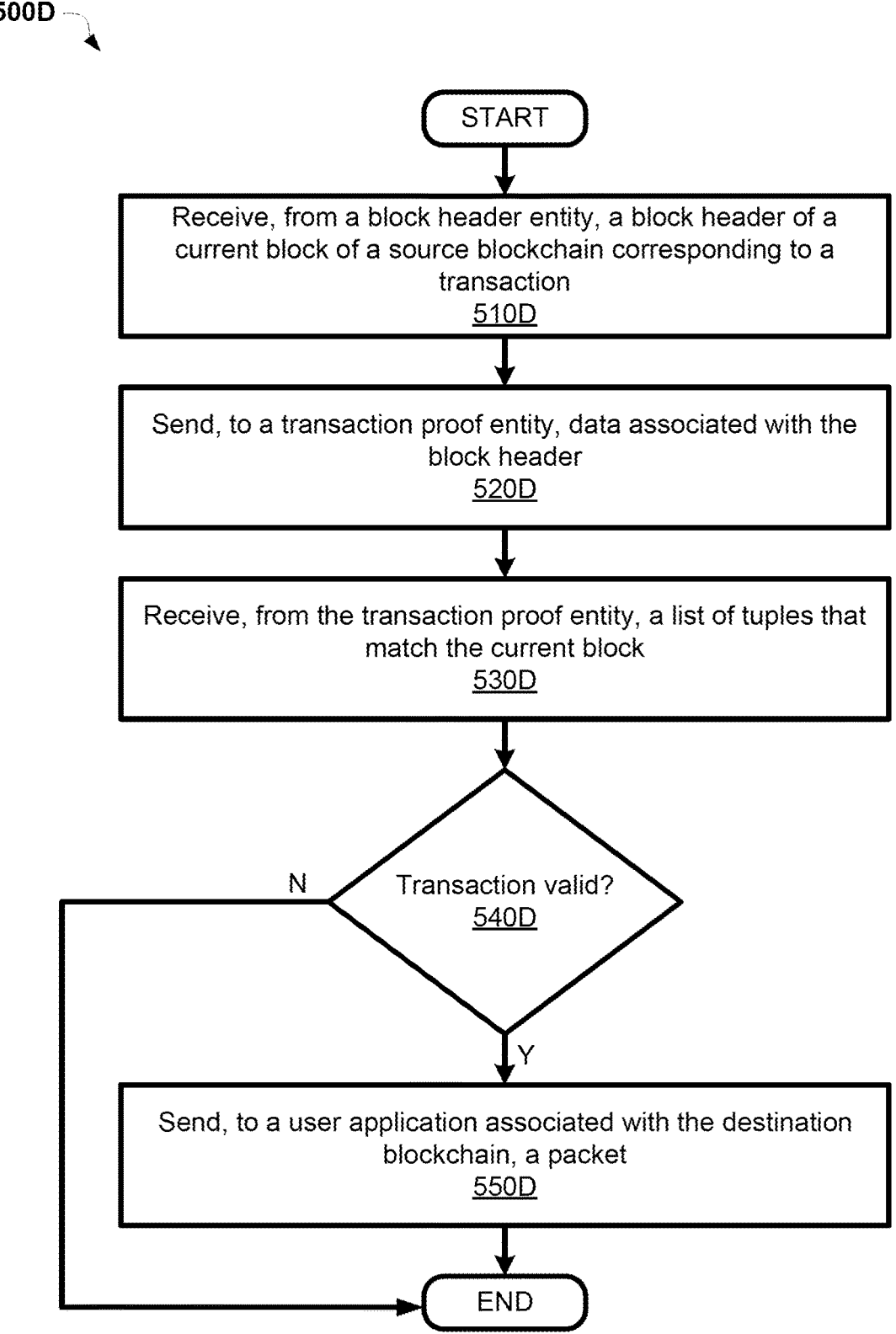

FIG. 5D depicts a flow diagram of an example method 500D for implementing a trustless omnichain interoperability protocol platform, in accordance with some implementations. For example, method 500D may be performed by endpoint 214B as shown in FIG. 2A. Method 500D may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500D.

At operation 510D, processing logic receives, from a block header entity, a block header of a current block of a source blockchain corresponding to a transaction. For example, as described above with reference to FIGS. 2 and 5C, the block header entity can obtain the block header from the source blockchain (e.g., read the block header from the source blockchain).

At operation 520D, processing logic sends data associated with the block header to a transaction proof entity. To ensure trustless valid delivery, it is assumed that the block header entity and the transaction proof entity are off-chain entities that do not collude. In some implementations, sending the data associated with the block header to the transaction proof entity includes generating the data associated with the block header in response to receiving the block header. In some implementations, the data associated with the block header includes a digest of the block header. For example, the data associated with the block header can include a hash of the block header.

At operation 530D, processing logic receives, from the transaction proof entity, a list of tuples that match the current block. For example, the list of tuples can be sent by the transaction proof entity in response to receiving the data associated with the block header. In some implementations, the list of tuples includes at least one tuple of a packet, a transaction identifier corresponding to the transaction, and a transaction proof of the transaction, that matches the current block. In some implementations, a packet of a tuple is a packet including a global identifier corresponding to a destination blockchain and a user payload. In some implementations, the global identifier is indicative of a smart contract on the destination blockchain. For example, the global identifier can point to the smart contract on the destination blockchain. In some implementations, the user payload includes data that a user application associated with the source blockchain wants to send to the user application associated with the destination blockchain.

In some implementations, the list of tuples includes zero tuples of a packet, a transaction identifier corresponding to the transaction, and a transaction proof of the transaction, that matches the current block. In this case, the transaction cannot be validated and the process would end.

At operation 540D, processing logic determines whether the transaction is valid based on the list of tuples. In some implementations, determining whether the transaction is valid includes determining whether the transaction is valid and committed. In some implementations, determining whether the transaction is valid includes determining whether the block header and the transaction proof match. In response to determining that the transaction is invalid (e.g., in response to determining that the block header and the transaction proof do not match), the process terminates.

In response to determining that the transaction is valid (e.g., in response to determining that the block header and the transaction proof match), at operation 550D, processing logic sends a packet to a user application associated with the destination blockchain. In some implementations, the packet includes the global identifier and the user payload. Further details regarding operations 510D-550D are described above with reference to FIGS. 2A-5C.

Figure 6A:
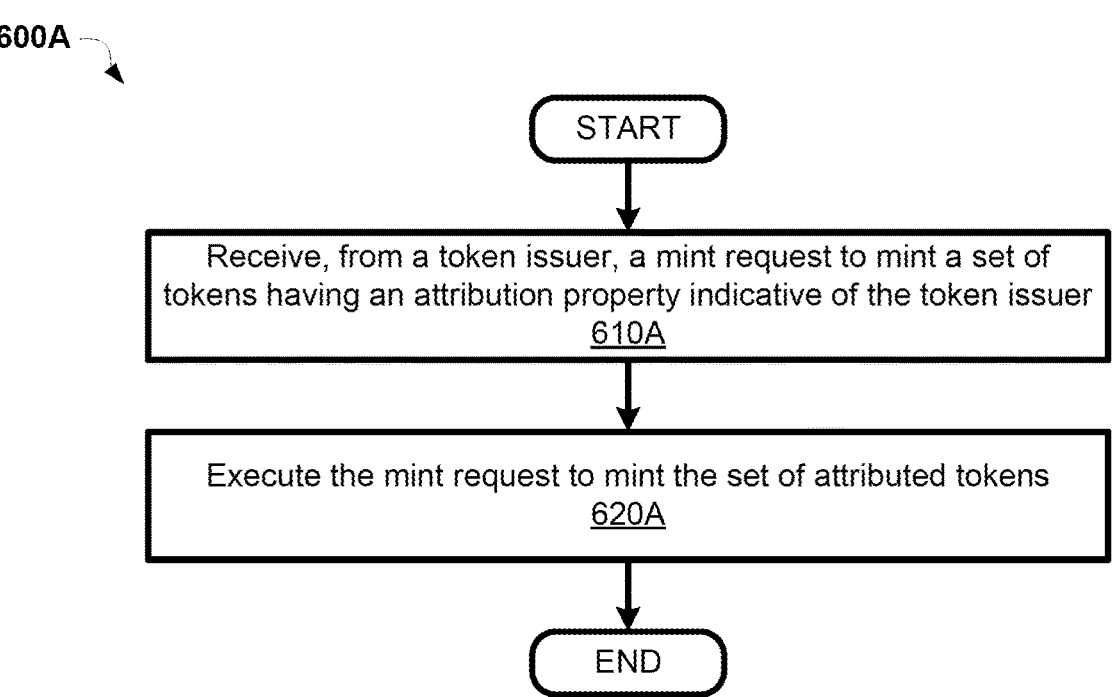

FIG. 6A depicts a flow diagram of an example method 600A implementing a mint function, in accordance with some implementations. For example, method 600A may be performed by vault 103 as shown in FIG. 1A. Method 600A may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600A.

At operation 610A, processing logic receives, from a token issuer, a mint request to mint a set of tokens having an attribution property indicative of the token issuer and, at operation 620A, processing logic executes the mint request to mint the set of tokens. Executing the mint request can include sending the set of tokens to the token issuer (e.g., updating a token balance of the token issuer maintained by a token contract of a blockchain linked to a digital wallet of the token issuer). For example, the mint request can define a number of tokens having the attribution property issuer, and mint the number of tokens defined by the mint request using the mint function in response to receiving the mint request. The token minter can be required to provide minting collateral for the minting in order to execute the mint request. Further details regarding operations 610A-620A are described above with reference to FIG. 1A.

Figure 6B:
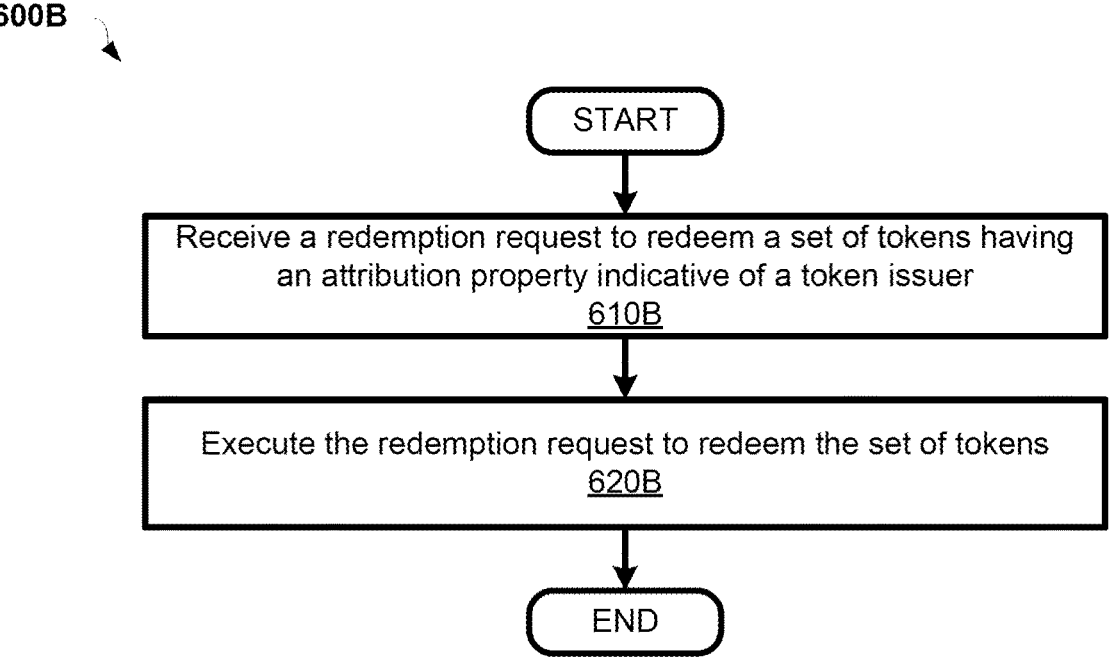

FIG. 6B depicts a flow diagram of an example method 600B for implementing a redemption function, in accordance with some implementations. For example, method 600B may be performed by vault 103 as shown in FIG. 1A. Method 600B may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600B.

At operation 610B, processing logic receives a redemption request to redeem a set of tokens having an attribution property indicative of a token issuer and, at operation 620B, processing logic redeems the set of tokens. For example, a redemption request can be received from a user account associated with a source blockchain to redeem a set of tokens in possession of the user account. Upon redemption of a token, the token is removed from circulation. Additionally, a token contract of the blockchain can be updated to reflect the removal of the token from circulation. Further details regarding operations 610B-620B are described above with reference to FIG. 1A.

FIG. 6C depicts a flow diagram of an example method 600C to implement a transfer function, in accordance with some implementations. For example, method 600C may be performed by platform 130 as shown in FIG. 1B. Method 600C may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600C.

At operation 610C, processing logic receives from a source user account associated with a source digital wallet of a source blockchain of a plurality of blockchains, a request to perform a cross-chain operation from the source blockchain to a destination blockchain of the plurality of local blockchains. The source blockchain can be associated with a source token contract. In some implementations, the source token contract stores a delta value indicative of a difference between a total number of tokens having an attribution property in circulation of the source blockchain and a number of tokens having the attribution property in circulation of the source blockchain that are accounted for by a vault of a primary blockchain. The attribution property of a token identifies a token issuer that minted the token. The vault stores a total number of tokens having the attribution property in circulation across the plurality of local blockchains. In some implementations, the token contract includes a smart contract. In some implementations, the vault includes a smart contract.

At operation 620C, processing logic causes a cross-chain message including a transaction payload to be generated and, at operation 630C, processing logic causes the transaction payload to be applied to the destination blockchain. In some implementations, the cross-chain message is generated based at least in part on the delta value.

In some implementations, the source token contract further stores a source token balance of tokens, of the source digital wallet, having the attribution property within the source digital wallet. In some implementations, the cross-chain operation is a cross-chain transfer operation to transfer, from the source token balance to a destination digital wallet of the destination blockchain, a transfer amount of tokens having the attribution property. In some implementations, causing the cross-chain message to be generated further includes debiting, from the token balance of the source digital wallet, the transfer amount of tokens having the attribution property to obtain a debited amount of tokens, and adding the debited amount of tokens to the transaction payload. In some implementations, causing the transaction payload to be applied to the destination blockchain further includes crediting the debited amount of tokens to a destination token balance maintained by a destination token contract of the destination blockchain.

In some implementations, the destination digital wallet is associated with a second attribution property different from the attribution property. In some implementations, the method further includes causing reattribution of: each token having the attribution property to the second attribution property, or each token having the second attribution property to the first attribution property.

In some implementations, the source token contract further stores a delta tracker value indicative of a difference between a total token deficit value across each attribution property that exists on the source blockchain and a total token surplus value across each attribution property that exists on the source blockchain. In some implementations, causing the cross-chain message to be generated further includes debiting, from the delta tracker value, at least a portion of the difference having a magnitude equal to a magnitude of the delta value.

In some implementations, the source token contract further stores a delta tracker value indicative of a difference between a total token deficit value across each attribution property that exists on the source blockchain and a total token surplus value across each attribution property that exists on the source blockchain. In some implementations, the cross-chain operation is a delta tracker value synchronization operation to transfer, to the destination blockchain, at least a portion of the difference having a magnitude equal to a magnitude of the delta value. In some implementations, causing the cross-chain message to be generated further includes debiting, from the delta tracker value, at least a portion of the difference to obtain a debited delta tracker value, and adding the debited delta tracker value to the transaction payload. In some implementations, causing the transaction payload to be applied to the destination blockchain further includes crediting the debited delta tracker value and the delta value to a destination token contract of the destination blockchain.

In some implementations, the delta value is a positive delta value indicative of a token surplus of tokens having the attribution property. In some implementations, the destination blockchain is the primary blockchain. In some implementations, the cross-chain operation is a remint operation to cause the vault to remint at least a portion of the token surplus. In some implementations, causing the cross-chain message to be generated further includes debiting, from the delta value, at least a portion of the token surplus to obtain a debited delta value, and adding the debited delta value to the transaction payload. In some implementations, causing the transaction payload to be applied to the destination blockchain further comprises crediting the debited delta value to the vault to update a global circulation of tokens having the attribution property.

In some implementations, the source token contract further stores a set of negative delta values, where each negative delta value of the set of negative delta values is indicative of a respective token deficit of tokens having a respective additional attribution property different from the attribution property corresponding to the positive delta value. In some implementations, causing the cross-chain message to be generated further includes debiting, from the set of negative delta values, one or more negative delta values having a combined negative delta value having a magnitude equal to the positive delta value. In some implementations, causing the transaction payload to be applied to the destination blockchain further includes crediting the one or more negative delta values to the vault to update one or more respective global circulation of tokens, where each respective global circulation of tokens corresponding to tokens has the respective additional attribution property.

In some implementations, the space complexity to perform the cross-chain operation is sublinear with respect to a total number of token issuers. In some implementations, the space complexity to perform the cross-chain operation is constant with respect to a total number of token issuers. Further details regarding operations 610C-630C are described above with reference to FIGS. 1A-6B.

Figure 7:
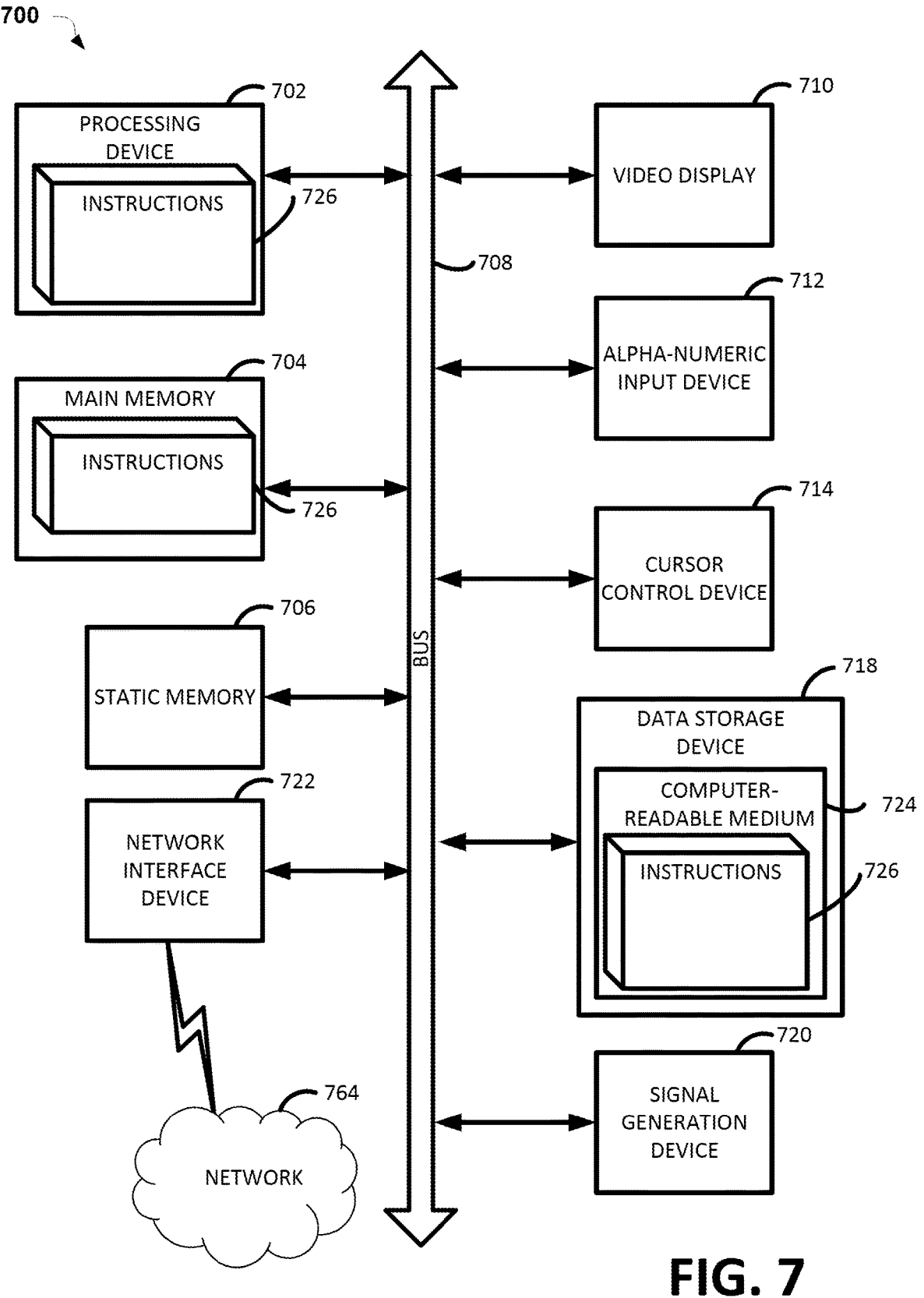
FIG. 7 is a block diagram of an illustrative computing device operating in accordance with the examples of the disclosure.

FIG. 7 depicts a block diagram of a computer system 700 operating in accordance with one or more aspects of the disclosure. In various illustrative examples, computer system 700 may correspond to one or more components of systems 100 and 200 of FIGS. 1-2B. Computer system 700 may be included within a data center that supports virtualization. Virtualization within a data center can result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network 764, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of executable instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720. Data storage device 716 may include a non-transitory computer-readable storage medium 724 on which may store instructions 726 encoding any one or more of the methods or functions described herein. Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of executable instructions for execution by a computer that causes the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "obtaining," "receiving," "causing," "executing," "sending," "initiating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
receiving, by at least one processing device, a request to perform a cross-chain operation from a source blockchain of a plurality of local blockchains to a destination blockchain of the plurality of local blockchains, wherein the source blockchain is associated with a source token contract that stores a delta value indicative of a difference between a total number of tokens having an attribution property in circulation of the source blockchain and a number of tokens having the attribution property in circulation of the source blockchain that are accounted for by a vault of a primary blockchain, wherein the attribution property identifies a token issuer, and wherein the vault stores a total number of tokens having the attribution property in circulation across the plurality of local blockchains; and performing, by the at least one processing device, the cross-chain operation with an associated space complexity that, based on use of the delta value for token reattribution, is sublinear with respect to a total number of token issuers, including:

causing a cross-chain message comprising a transaction payload to be generated based at least in part on the delta value; and causing the transaction payload to be applied to the destination blockchain.

2. The method of claim 1, wherein:

the source token contract further stores a source token balance of tokens, of a source digital wallet, having the attribution property within the source digital wallet;

the cross-chain operation is a cross-chain transfer operation to transfer, from the source token balance to a destination digital wallet of the destination blockchain, a transfer amount of tokens having the attribution property;

causing the cross-chain message to be generated further comprises debiting, from the source token balance, the transfer amount of tokens having the attribution property to obtain a debited amount of tokens, and adding the debited amount of tokens to the transaction payload; and causing the transaction payload to be applied to the destination blockchain further comprises crediting the debited amount of tokens to a destination token balance maintained by a destination token contract of the destination blockchain.

3. The method of claim 2, wherein:

the destination digital wallet is associated with a second attribution property different from the attribution property; and the method further comprises causing, by the at least one processing device, reattribution of: each token having the attribution property to the second attribution property, or each token having the second attribution property to the attribution property.

4. The method of claim 2, wherein:

the source token contract further stores a delta tracker value indicative of a difference between a total token deficit value across each attribution property that exists on the source blockchain and a total token surplus value across each attribution property that exists on the source blockchain; and causing the cross-chain message to be generated further comprises debiting, from the delta tracker value, at least a portion of the difference having a magnitude equal to a magnitude of the delta value.

5. The method of claim 1, wherein:

the source token contract further stores a delta tracker value indicative of a difference between a total token deficit value across each attribution property that exists on the source blockchain and a total token surplus value across each attribution property that exists on the source blockchain;

the cross-chain operation is a delta tracker value synchronization operation to transfer, to the destination blockchain, at least a portion of the difference having a magnitude equal to a magnitude of the delta value;

causing the cross-chain message to be generated further comprises debiting, from the delta tracker value, at least a portion of the difference to obtain a debited delta tracker value, and adding the debited delta tracker value to the transaction payload; and causing the transaction payload to be applied to the destination blockchain further comprises crediting the debited delta tracker value and the delta value to a destination token contract of the destination blockchain.

6. The method of claim 1, wherein:

the delta value is a positive delta value indicative of a token surplus of tokens having the attribution property;

the destination blockchain is the primary blockchain;

the cross-chain operation is a remint operation to cause the vault to remint at least a portion of the token surplus;

causing the cross-chain message to be generated further comprises debiting, from the delta value, at least a portion of the token surplus to obtain a debited delta value, and adding the debited delta value to the transaction payload; and causing the transaction payload to be applied to the destination blockchain further comprises crediting the debited delta value to the vault to update a global circulation of tokens having the attribution property.

7. The method of claim 6, wherein:

the source token contract further stores a set of negative delta values, each negative delta value of the set of negative delta values being indicative of a respective token deficit of tokens having a respective additional attribution property different from the attribution property corresponding to the positive delta value;

causing the cross-chain message to be generated further comprises debiting, from the set of negative delta values, one or more negative delta values having a combined negative delta value having a magnitude equal to the positive delta value; and causing the transaction payload to be applied to the destination blockchain further comprises crediting the one or more negative delta values to the vault to update one or more respective global circulation of tokens, each respective global circulation of tokens corresponding to tokens having the respective additional attribution property.

8. The method of claim 1, wherein the associated space complexity to perform the cross-chain operation is constant with respect to the total number of token issuers.

9. The method of claim 1, wherein the source token contract comprises a smart contract.

10. A system comprising:

a memory; and a processing device, operatively coupled to a memory, to perform operations comprising:

receiving a request to perform a cross-chain operation from a source blockchain of a plurality of local blockchains to a destination blockchain of the plurality of local blockchains, wherein the source blockchain is associated with a source token contract that stores a delta value indicative of a difference between a total number of tokens having an attribution property in circulation of the source blockchain and a number of tokens having the attribution property in circulation of the source blockchain that are accounted for by a vault of a primary blockchain, wherein the attribution property identifies a token issuer, and wherein the vault stores a total number of tokens having the attribution property in circulation across the plurality of local blockchains; and performing the cross-chain operation with an associated space complexity that, based on use of the delta value for token reattribution, is sublinear with respect to a total number of token issuers, including:

causing a cross-chain message comprising a transaction payload to be generated based at least in part on the delta value;

causing the transaction payload to be applied to the destination blockchain.

11. The system of claim 10, wherein:

the source token contract further stores a source token balance of tokens, of a source digital wallet, having the attribution property within the source digital wallet;

the cross-chain operation is a cross-chain transfer operation to transfer, from the source token balance to a destination digital wallet of the destination blockchain, a transfer amount of tokens having the attribution property;

causing the cross-chain message to be generated further comprises debiting, from the source token balance, the transfer amount of tokens having the attribution property to obtain a debited amount of tokens, and adding the debited amount of tokens to the transaction payload; and causing the transaction payload to be applied to the destination blockchain further comprises crediting the debited amount of tokens to a destination token balance maintained by a destination token contract of the destination blockchain.

12. The system of claim 11, wherein:

the destination digital wallet is associated with a second attribution property different from the attribution property; and the operations further comprise causing reattribution of: each token having the attribution property to the second attribution property, or each token having the second attribution property to the attribution property.

13. The system of claim 11, wherein:

the source token contract further stores a delta tracker value indicative of a difference between a total token deficit value across each attribution property that exists on the source blockchain and a total token surplus value across each attribution property that exists on the source blockchain; and causing the cross-chain message to be generated further comprises debiting, from the delta tracker value, at least a portion of the difference having a magnitude equal to a magnitude of the delta value.

14. The system of claim 10, wherein:

the source token contract further stores a delta tracker value indicative of a difference between a total token deficit value across each attribution property that exists on the source blockchain and a total token surplus value across each attribution property that exists on the source blockchain;

the cross-chain operation is a delta tracker value synchronization operation to transfer, to the destination blockchain, at least a portion of the difference having a magnitude equal to a magnitude of the delta value;

causing the cross-chain message to be generated further comprises debiting, from the delta tracker value, at least a portion of the difference to obtain a debited delta tracker value, and adding the debited delta tracker value to the transaction payload; and causing the transaction payload to be applied to the destination blockchain further comprises crediting the debited delta tracker value and the delta value to a destination token contract of the destination blockchain.

15. The system of claim 10, wherein:

the delta value is a positive delta value indicative of a token surplus of tokens having the attribution property;

the destination blockchain is the primary blockchain;

the cross-chain operation is a remint operation to cause the vault to remint at least a portion of the token surplus;

causing the cross-chain message to be generated further comprises debiting, from the delta value, at least a portion of the token surplus to obtain a debited delta value, and adding the debited delta value to the transaction payload; and causing the transaction payload to be applied to the destination blockchain further comprises crediting the debited delta value to the vault to update a global circulation of tokens having the attribution property.

16. The system of claim 15, wherein:

the source token contract further stores a set of negative delta values, each negative delta value of the set of negative delta values being indicative of a respective token deficit of tokens having a respective additional attribution property different from the attribution property corresponding to the positive delta value;

causing the cross-chain message to be generated further comprises debiting, from the set of negative delta values, one or more negative delta values having a combined negative delta value having a magnitude equal to the positive delta value; and causing the transaction payload to be applied to the destination blockchain further comprises crediting the one or more negative delta values to the vault to update one or more respective global circulation of tokens, each respective global circulation of tokens corresponding to tokens having the respective additional attribution property.

17. The system of claim 10, wherein the associated space complexity to perform the cross-chain operation is constant with respect to the total number of token issuers.

18. The system of claim 10, wherein the source token contract comprises a smart contract.

\* \* \* \* \*